US012634031B2

(12) United States Patent (10) Patent No.: US 12,634,031 B2
Sasaki (45) Date of Patent: May 19, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Akitomo Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 18/340,712

(22) Filed: Jun. 23, 2023

(65) Prior Publication Data

US 2023/0421282 A1 Dec. 28, 2023

(30) Foreign Application Priority Data

Jun. 27, 2022 (JP) ................................. 2022-102390

(51) Int. Cl.
*H04J 3/06* (2006.01)

(52) U.S. Cl.
CPC .......... *H04J 3/0697* (2013.01); *H04J 3/0667* (2013.01); *H04J 3/0673* (2013.01)

(58) Field of Classification Search
CPC ...... H04J 3/0635; H04J 3/0638; H04J 3/0658; H04J 3/0667; H04J 3/0673; H04J 3/0697; H04W 56/001; H04W 56/0065
See application file for complete search history.

(56) References Cited

U.S. PATENT DOCUMENTS

| | | | | |
|---|---|---|---|---|
| 8,462,821 | B1* | 6/2013 | Sagarwala | H04J 3/0667 |
| | | | | 370/503 |
| 8,964,790 | B2* | 2/2015 | Saito | H04J 3/0697 |
| | | | | 370/503 |
| 9,843,405 | B2* | 12/2017 | Aweya | G06F 1/10 |
| 10,104,657 | B2* | 10/2018 | Otsu | H04W 72/0446 |
| 10,608,764 | B2* | 3/2020 | Chaloupka | H04J 3/0644 |
| 10,901,372 | B2* | 1/2021 | Ogawa | G04R 20/02 |
| 2017/0150464 | A1* | 5/2017 | Kazehaya | H04L 12/422 |
| 2021/0204230 | A1* | 7/2021 | Van Phan | H04J 3/0667 |
| 2022/0131681 | A1* | 4/2022 | Maruyama | H04J 3/0667 |
| 2022/0345290 | A1* | 10/2022 | Matsumoto | H04N 21/8547 |

FOREIGN PATENT DOCUMENTS

JP 2017211828 A 11/2017

* cited by examiner

*Primary Examiner* — Alpus Hsu
(74) *Attorney, Agent, or Firm* — Canon U.S.A., Inc. IP Division

(57) ABSTRACT
A communication apparatus connected to a first another communication apparatus is configured to: obtain a sending time of a time synchronization packet for performing time synchronization processing in accordance with precision time protocol (PTP), sent from a second another communication apparatus connected to the first another communication apparatus, in the second another communication apparatus; obtain a reception time of the time synchronization packet in the communication apparatus; and calculate a residence time of the time synchronization packet in the first another communication apparatus using the sending time and the reception time in a case where the first another communication apparatus functions as an apparatus operating as a repeater that sends a packet received from the communication apparatus or the second another communication apparatus without applying certain processing to the packet.

11 Claims, 19 Drawing Sheets

Figure 16:
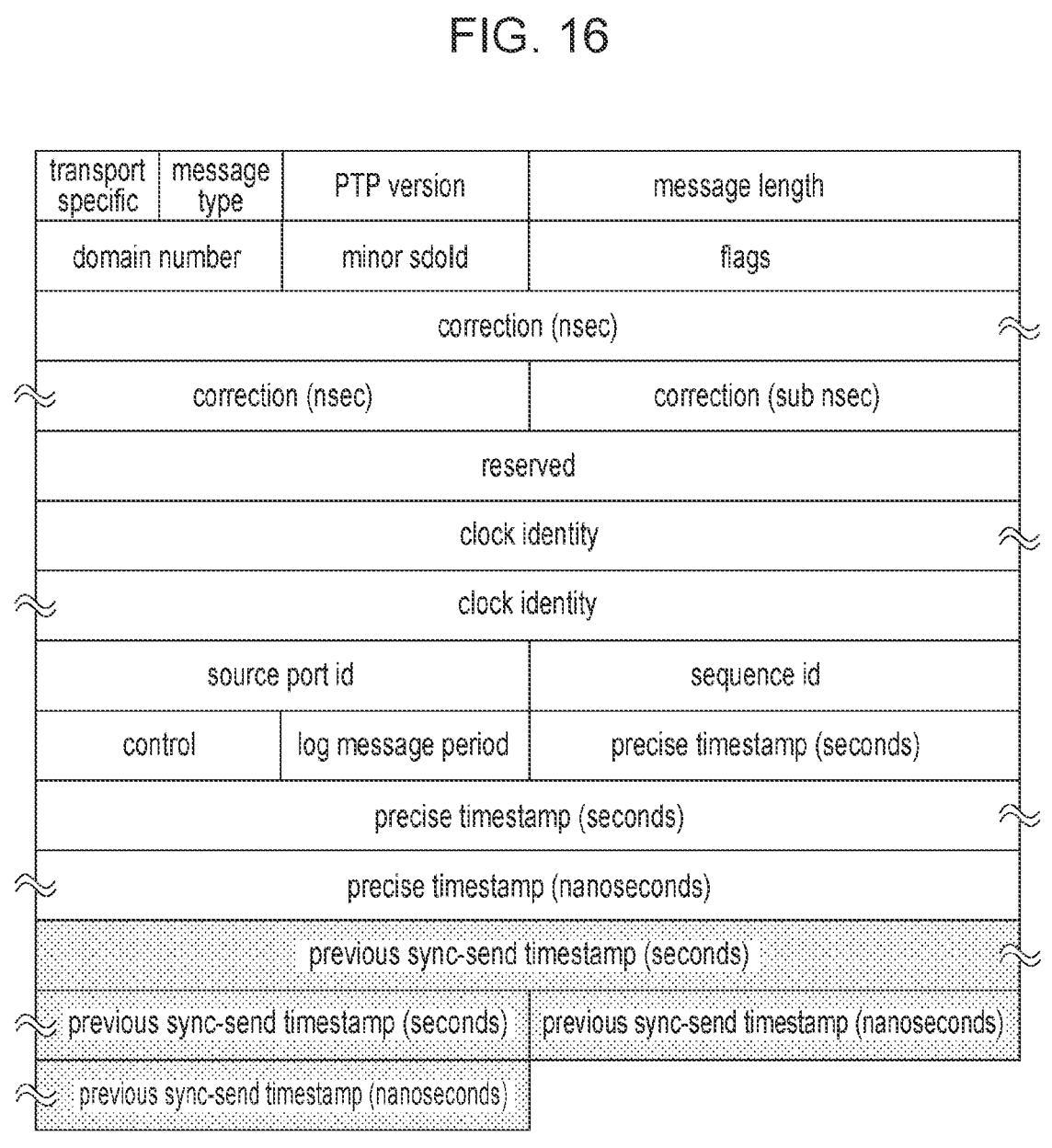

| transport specific | message type | PTP version | message length |
|---|---|---|---|
| domain number | | minor sdoId | flags |
| correction (nsec) | | | |
| correction (nsec) | | correction (sub nsec) | |
| reserved | | | |
| clock identity | | | |
| clock identity | | | |
| source port id | | sequence id | |
| control | log message period | precise timestamp (seconds) | |
| precise timestamp (seconds) | | | |
| precise timestamp (nanoseconds) | | | |
| previous sync-send timestamp (seconds) | | | |
| previous sync-send timestamp (seconds) | | previous sync-send timestamp (nanoseconds) | |
| previous sync-send timestamp (nanoseconds) | | | |

FIG. 17

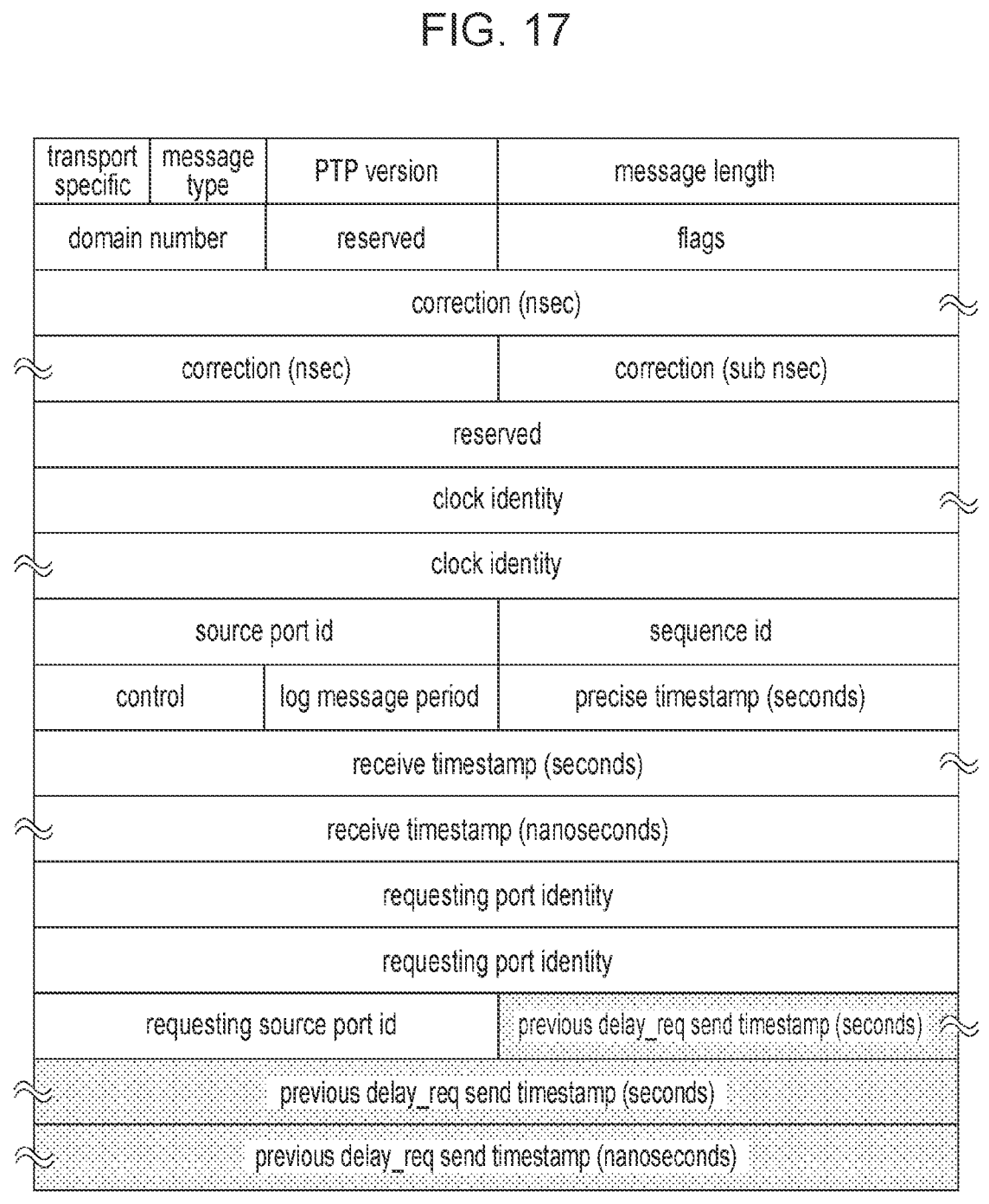

| transport specific | message type | PTP version | message length |
|---|---|---|---|
| domain number | | reserved | flags |
| correction (nsec) | | | ≈ |
| correction (nsec) | | correction (sub nsec) | |
| reserved | | | |
| clock identity | | | ≈ |
| clock identity | | | |
| source port id | | sequence id | |
| control | log message period | precise timestamp (seconds) | |
| receive timestamp (seconds) | | | ≈ |
| receive timestamp (nanoseconds) | | | |
| requesting port identity | | | |
| requesting port identity | | | |
| requesting source port id | | previous delay_req send timestamp (seconds) ≈ | |
| previous delay_req send timestamp (seconds) | | | |
| previous delay_req send timestamp (nanoseconds) | | | |

COMMUNICATION APPARATUS, CONTROL METHOD FOR COMMUNICATION APPARATUS, AND STORAGE MEDIUM

BACKGROUND OF THE DISCLOSURE

Field of the Disclosure

The present disclosure relates to synchronization control technology for synchronizing multiple communication apparatuses connected to a network.

Description of the Related Art

A connection method called a daisy chain is known, in which multiple communication apparatuses each have multiple network interfaces, and the multiple apparatuses are network-connected by connecting their network interfaces. For example, Japanese Patent Laid-Open No. 2017-211828 discloses technology for a network system where multiple communication apparatuses are daisy-chain connected, to perform time synchronization in order to allow the multiple communication apparatuses to shoot images synchronously.

In the case where time synchronization is performed in a daisy-chain-connected network system disclosed in Japanese Patent Laid-Open No. 2017-211828, each communication apparatus sends a packet for time synchronization received at one network interface to the other network interface. At this time, the communication apparatus measures the time (residence time) taken from the reception to the sending (relaying) of the packet, and notifies another communication apparatus thereof so as not to deteriorate the accuracy of time synchronization. In the meantime, in such a network system, when one of the communication apparatuses enters a failure state or a sleep state, communication apparatuses connected farther than this communication apparatus are disabled to communicate in the network system.

To deal with such a case, for example, each communication apparatus is provided with a function of passing a communication packet in the case where the communication apparatus enters a failure state or a sleep state (a function of operating as a repeater), which enables communication apparatuses connected farther than this communication apparatus to communicate. However, the communication apparatus operating as a repeater is able to pass a packet for time synchronization but is unable to measure the residence time of the packet at that time, which may result in the deterioration of the accuracy of synchronization in the network system.

SUMMARY OF THE INVENTION

The present disclosure provides technology for performing time synchronization without deteriorating the accuracy of synchronization, regardless of the state of a communication apparatus connected to a network.

A control method for a communication apparatus connected to a first communication apparatus according to an aspect of the present disclosure, includes: obtaining a sending time of a time synchronization packet for performing time synchronization processing in accordance with precision time protocol (PTP), sent from a second communication apparatus connected to the first communication apparatus, in the second communication apparatus; obtaining a reception time of the time synchronization packet in the communication apparatus; and calculating a residence time of the time synchronization packet in the first communication apparatus using the sending time and the reception time in a case where the first communication apparatus functions as an apparatus operating as a repeater that sends a packet received from the communication apparatus or the second communication apparatus without applying certain processing to the packet.

Further features of the present disclosure will become apparent from the following description of exemplary embodiments with reference to the attached drawings.

BRIEF DESCRIPTION OF THE DRAWINGS

FIG. 9 is a sequence diagram illustrating a time synchronization procedure in the case where there is a communication apparatus operating as a repeater.

FIG. 16 illustrates an exemplary format of a Follow_Up packet according to the embodiment.

FIG. 17 illustrates an exemplary format of a Delay_Req sending time reporting packet according to the embodiment.

DESCRIPTION OF THE EMBODIMENTS

Hereinafter, embodiments for implementing the present disclosure will be described in detail with reference to the accompanying drawings. Note that the embodiments described hereinafter are examples of means for realizing the present disclosure, and are intended to be modified or changed as appropriate depending on the configuration of an apparatus to which the present disclosure is applied, as well as various conditions, and the present disclosure is not limited to the following embodiments. Furthermore, not all of the combinations of features described in the embodiments are essential to the solution of the present disclosure.

First Embodiment

Configuration of Communication Apparatus

Figure 1:
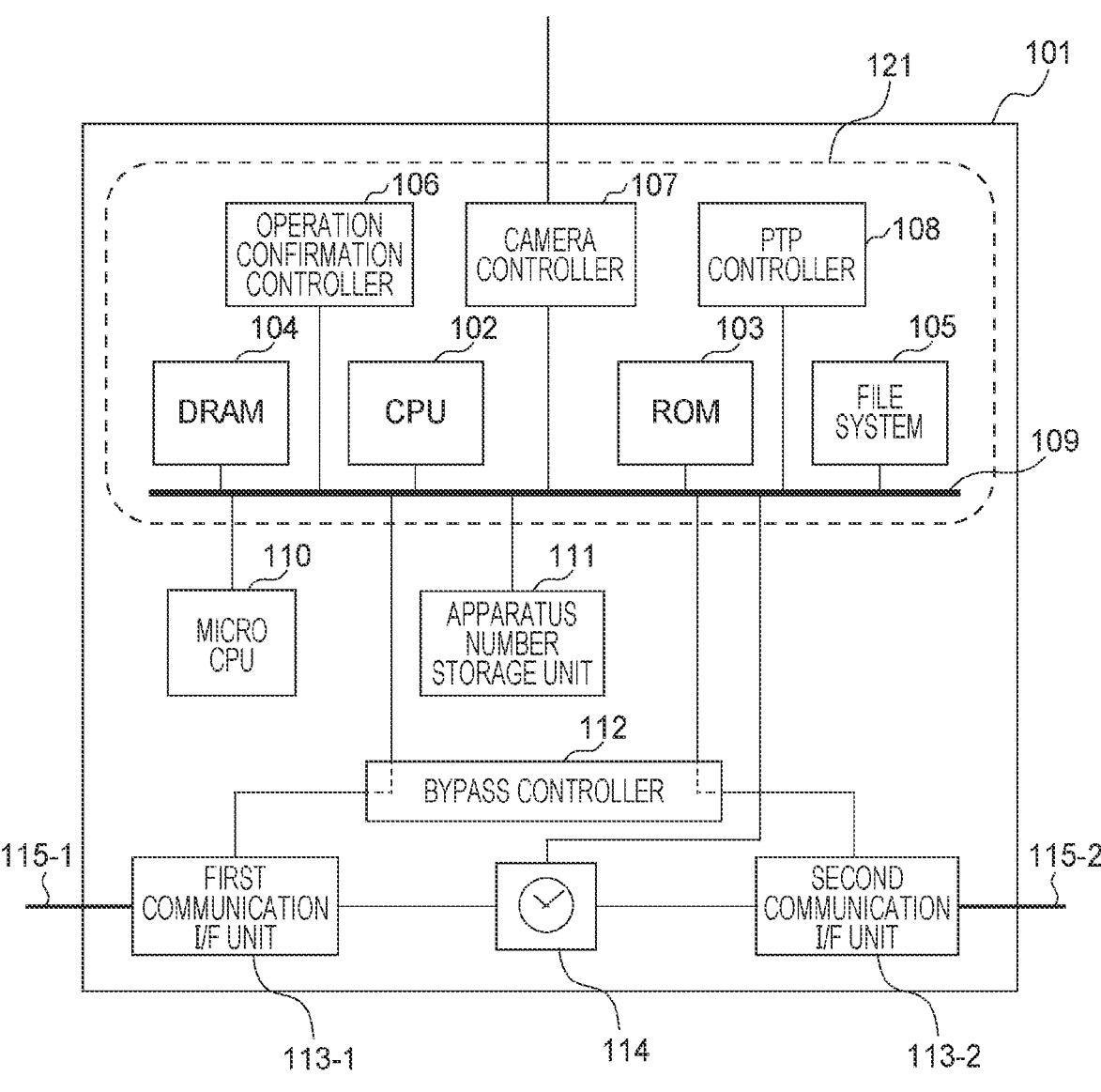
FIG. 1 illustrates an exemplary configuration of a communication apparatus according to an embodiment.

FIG. 1 illustrates an exemplary configuration of a communication apparatus 101 according to a first embodiment. The communication apparatus 101 is an apparatus capable of executing time synchronization processing in accordance with Precision Time Protocol (PTP) or PTP Version 2 (PTPv2), which are the IEEE 1588 standards. The communication apparatus 101 may further be configured to be able to execute time synchronization processing in a manner extending PTPv2. Referring to FIG. 1, the communication apparatus 101 includes a main system unit 121, a micro central processing unit (CPU) 110, an apparatus number storage unit 111, a bypass controller 112, a first communication interface (I/F) unit 113-1, a second communication I/F unit 113-2, and a clock unit 114. Note that the communication apparatus 101 according to the present embodiment may be individually assigned a different apparatus number when an image communication system 10 (FIG. 4, etc.) is set.

The main system unit 121 execute software such as the operating system (OS) and application programs, and performs camera control and communication control. The main system unit 121 includes a CPU 102, a read-only memory (ROM) 103, a dynamic random-access memory (DRAM) 104, a file system 105, an operation confirmation controller 106, a camera controller 107, a PTP controller 108, and a bus 109. The bus 109 is a bus that connects the CPU 102, the ROM 103, the DRAM 104, and so forth. The camera controller 107 controls an image-shooting camera (not illustrated) connected to the communication apparatus 101.

The first communication I/F unit 113-1 and the second communication I/F unit 113-2 are each an interface unit for connecting to an external apparatus. A transmission line 115-1 is connected to the first communication I/F unit 113-1, and a transmission line 115-2 is connected to the second communication I/F unit 113-2.

Note that the transmission lines may be formed of Ethernet (registered trademark) cables in the present embodiment. The clock unit 114 is connected to the first communication I/F unit 113-1 and the second communication I/F unit 113-2. The clock unit 114 records the sending time upon sending a packet and the reception time upon receiving a packet by the first communication I/F unit 113-1 and the second communication I/F unit 113-2.

The operation confirmation controller 106 detects whether another communication apparatus connected adjacent to the communication apparatus 101 via the first communication I/F unit 113-1 or the second communication I/F unit 113-2 is operating as a repeater (whether this other communication apparatus is an apparatus operating as a repeater). The detection processing will be described later. The PTP controller 108 synchronizes the clock unit 114 with a time server 403 (FIG. 4, etc.) by communicating with the time server 403 based on PTP (communicating time synchronization packets (PTP packets) for performing time synchronization processing in accordance with PTP). The PTP packets include Sync packets, Follow_Up packets, Delay_Req packets, and Delay_Resp packets.

The apparatus number storage unit 111 has the function of recording the apparatus number of the communication apparatus 101. The apparatus number may be set in the apparatus number storage unit 111 when the image communication system 10 is set. Note that the apparatus number storage unit 111 may be contained in the ROM 103, or may be set in the DRAM 104 upon activation of the communication apparatus 101. Moreover, the apparatus number storage unit 111 stores, associatively with the apparatus number, information indicating whether the communication apparatus 101 is connected to the beginning or the end of a daisy chain.

The micro CPU 110 has the function of controlling the bypass controller 112. Specifically, the micro CPU 110 switches the bypass operation of the bypass controller 112 to be enabled or disabled. The bypass controller 112 performs the bypass operation when the bypass operation is enabled by the micro CPU 110. In other words, the bypass controller 112 operates to forward a packet received at the first communication I/F unit 113-1 to the second communication I/F unit 113-2, and to forward a packet received at the second communication I/F unit 113-2 to the first communication I/F unit 113-1. When the bypass operation is enabled by the micro CPU 110, the communication apparatus 101 operates as a repeater.

Figure 2:
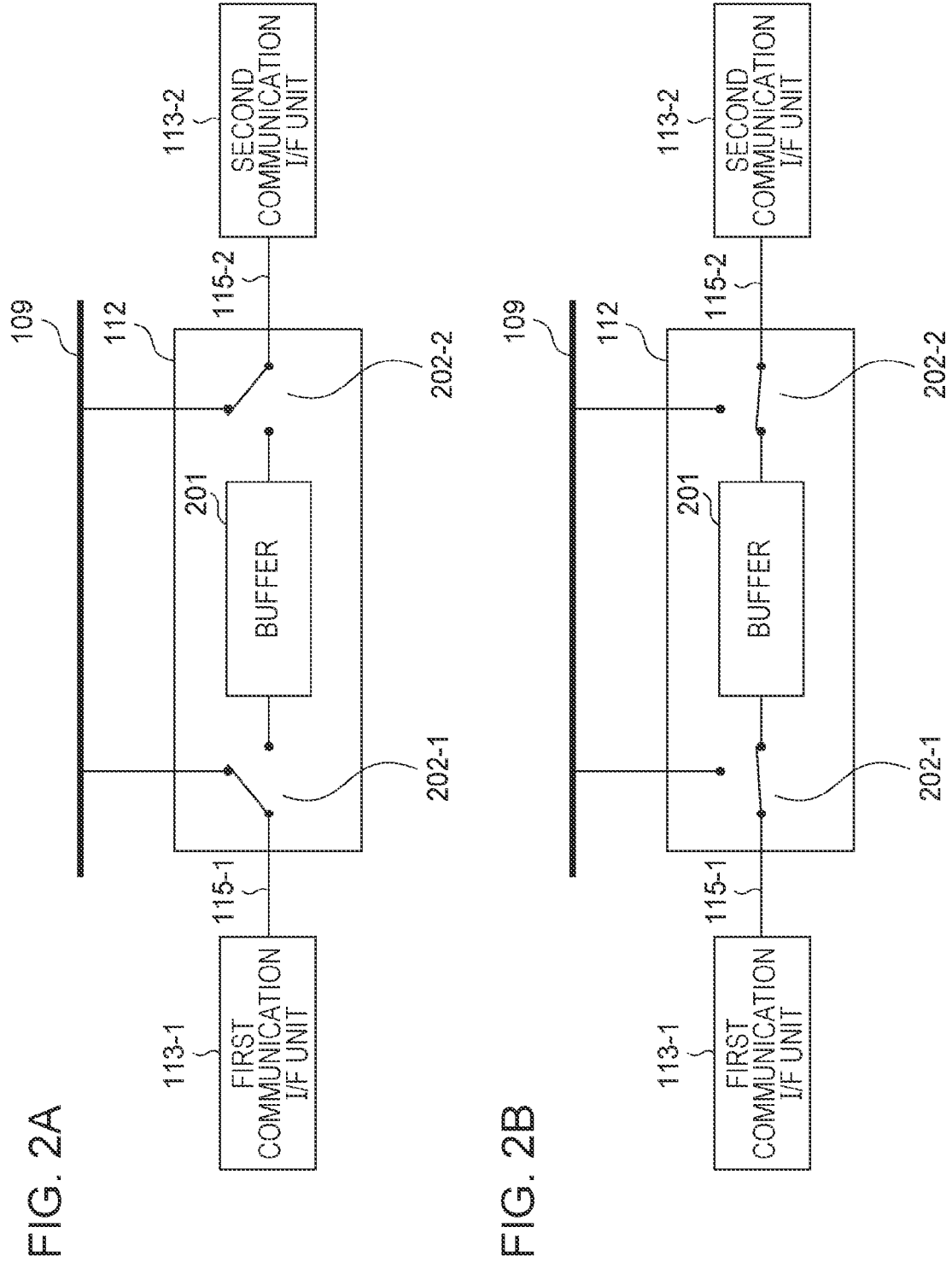
FIGS. 2A and 2B are diagrams illustrating an exemplary internal configuration of a bypass controller (FIG. 2A illustrating the case of operating normally, and FIG. 2B illustrating the case of operating as a repeater).

An exemplary operation of the bypass controller 112 will be described with reference to FIGS. 2A and 2B. FIGS. 2A and 2B are diagrams illustrating an exemplary internal configuration of the bypass controller 112. FIG. 2A illustrates an exemplary internal configuration in the case where the bypass controller 112 does not perform the bypass operation (the case of operating normally). In FIG. 2A, bypass switches 202-1 and 202-2 are switched under control of the micro CPU 110 so that the first communication I/F unit 113-1 and the bus 109 will be connected and the second communication I/F unit 113-2 and the bus 109 will be connected. As a result, the bypass controller 112 operates to pass all packets received via the first communication I/F unit 113-1 or the second communication I/F unit 113-2 to the main system unit 121 through the bus 109. The main system unit 121 applies certain processing to these packets.

FIG. 2B illustrates an exemplary internal configuration in the case where the bypass controller 112 performs the bypass operation. In FIG. 2B, the bypass switches 202-1 and 202-2 are switched under control of the micro CPU 110 so that the first communication I/F unit 113-1, a buffer 201, and the second communication I/F unit 113-2 will be connected. As a result, the bypass controller 112 operates to send a packet received by the first communication I/F unit 113-1 from the second communication I/F unit 113-2, and to send a packet received by the second communication I/F unit 113-2 from the first communication I/F unit 113-1. The first communication I/F unit 113-1 and the second communication I/F unit 113-2 need to perform sending processing in units of packets. Therefore, during the bypass operation, the bypass controller 112 uses the buffer 201 to buffer a received packet until the data of the packet is fully received, and then performs sending processing in units of packets.

Figure 3:
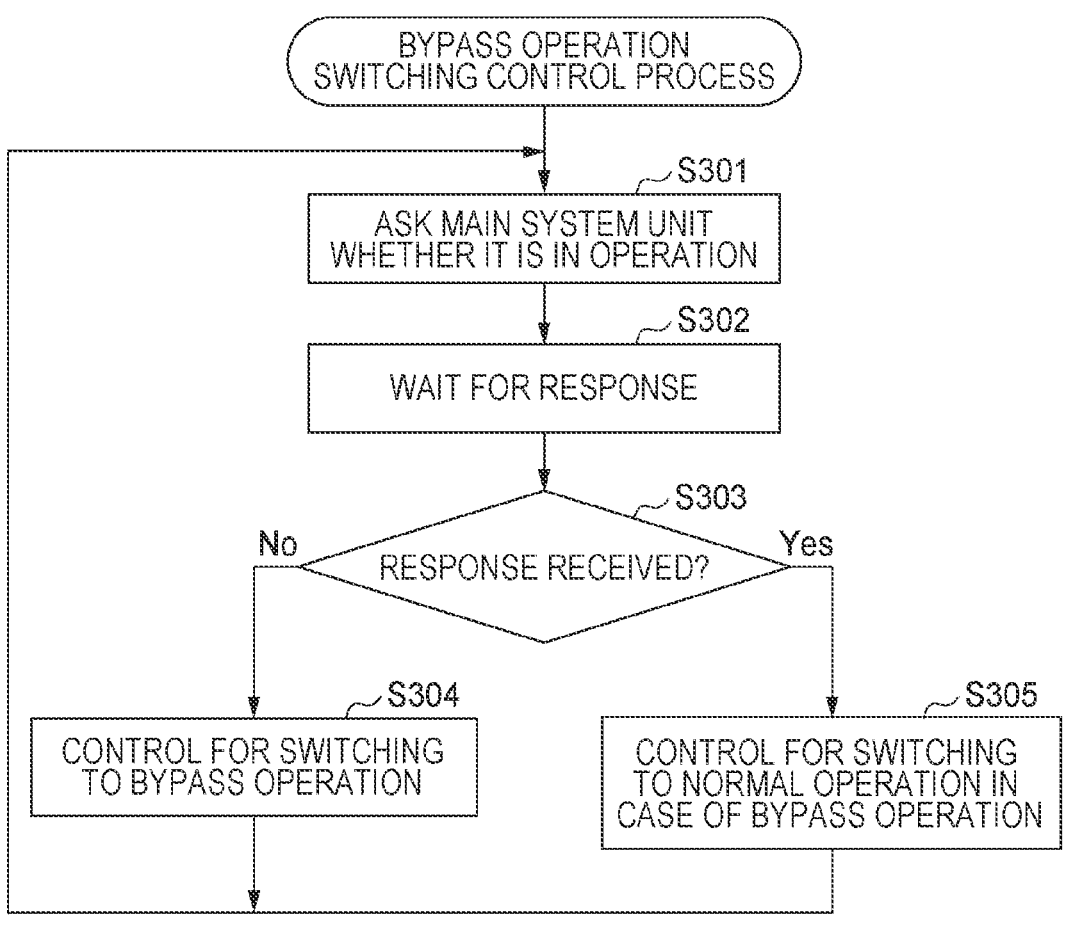
FIG. 3 illustrates a flowchart of control performed by a microcomputer central processing unit (CPU).

FIG. 3 is a flowchart illustrating a control process (a switching control process from the normal operation to the bypass operation of the bypass controller 112) performed by the micro CPU 110. At the time the communication apparatus 101 is activated or initialized, the bypass controller 112 is in the normal operation state illustrated in FIG. 2A. The micro CPU 110 asks the main system unit 121 whether it is in operation (S301), and waits for a response (S302). The wait time is two seconds, for example. The main system unit 121 is configured to respond to the inquiry if it is in operation. If a response is received from the main system unit 121 within the wait time (Yes in S303), the micro CPU 110 controls the bypass controller 112 to switch to the normal operation only when the bypass controller 112 is currently performing the bypass operation (S305), and the process returns to S301. In contrast, if no response is received from the main system unit 121 within the wait time (No in S303), the micro CPU 110 controls the bypass controller 112 to switch to the bypass operation (S304). As a result, the bypass controller 112 is switched to the configuration as illustrated in FIG. 2B.

Configuration of Image Communication System

Figure 4:
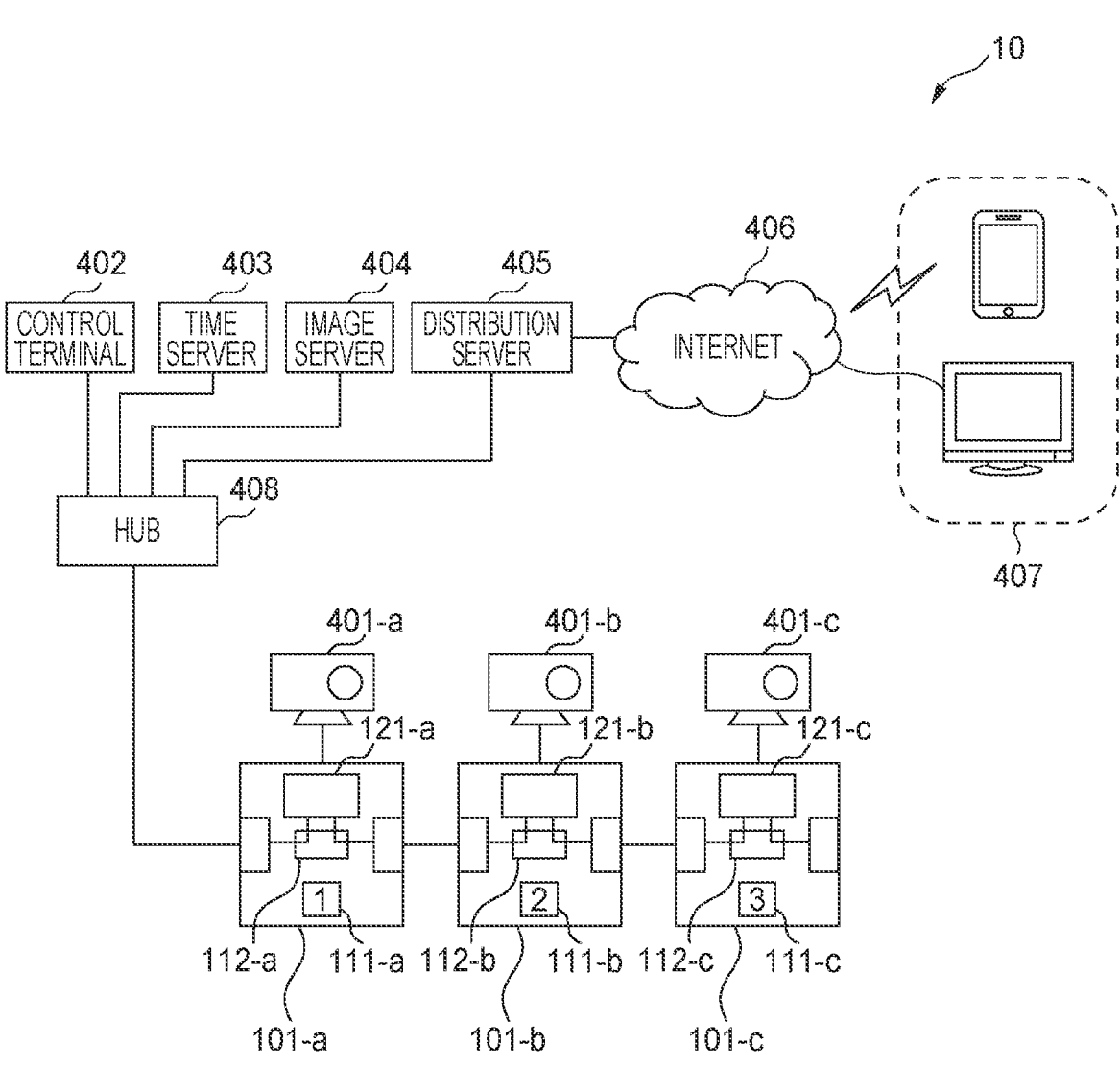
FIG. 4 illustrates an exemplary configuration of an image communication system according to a first embodiment (in the case where all communication apparatuses are operating normally).

FIG. 4 illustrates an exemplary configuration of the image communication system 10 using the communication apparatus 101 illustrated in FIG. 1. In the image communication system 10, communication apparatuses 101-*a* to 101-*c*, which have the same configuration as the communication apparatus 101, are connected to each other. The communication apparatuses 101-*a* to 101-*c* each have two communication I/F units (the first communication I/F unit 113-1 and the second communication I/F unit 113-2), and are connected to form a daisy chain by connecting their communication I/F units. The communication apparatuses 101-*a* to 101-*c* are connected to cameras 401-*a* to 401-*c*, respectively. The communication apparatuses 101-*a* to 101-*c* include main system units 121-*a* to 121-*c* corresponding to the main system unit 121, and bypass controllers 112-*a* to 112-*c* corresponding to the bypass controller 112. The communication apparatuses 101-*a* to 101-*c* may be collectively referred to as the communication apparatuses 101, and the cameras 401-*a* to 401-*c* may be collectively referred to as the cameras 401.

The first communication I/F unit 113-1 of the communication apparatus 101-*a* is connected to a hub 408.

A control terminal 402, the time server 403, an image server 404, and a distribution server 405 are connected to the hub 408. The hub 408 has the function of a transparent clock (TC) of PTP in the present embodiment. Images shot by the cameras 401 are sent by the communication apparatuses 101 to the image server 404. The image server 404 collects and edits images shot by the cameras 401 connected to the communication apparatuses 101. Note that the term "image" in the present embodiment may include a still image and/or a moving image. The control terminal 402 controls the image communication system 10 in accordance with operations performed by the user. The time server 403 is used for performing time synchronization of the communication apparatuses 101. In the present embodiment, the time server 403 is a server that synchronizes with a high-precision time source such as Global Positioning System (GPS) and distributes time information using PTP. The distribution server 405 is connected to the Internet 406. As a result, images collected and edited by the image server 404 can be distributed to display devices 407, which are devices used by end users, through the Internet 406.

As described above, the communication apparatuses 101 each include the apparatus number storage unit 111, which stores the apparatus number set to the communication apparatus 101. In the example of FIG. 4, the apparatus numbers are set in ascending order from the communication apparatus 101 closest to the hub 408, and "1" is set to the communication apparatus 101-*a*, "2" to the communication apparatus 101-*b*, and "3" to the communication apparatus 101-*c*.

Figure 5:
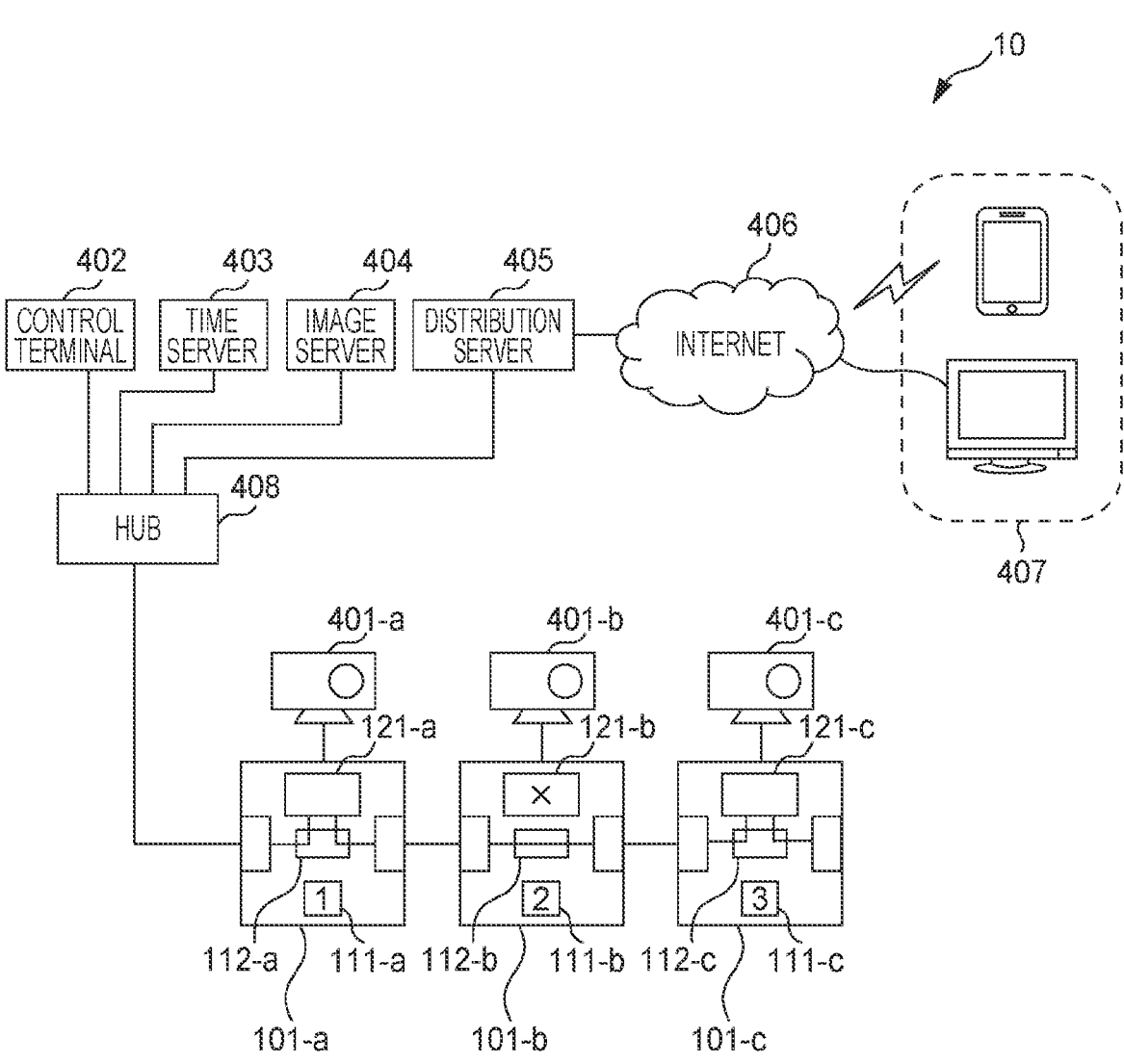
FIG. 5 illustrates an exemplary configuration of the image communication system according to the first embodiment (in the case where one communication apparatus is operating as a repeater).

In the image communication system 10 illustrated in FIG. 4, an exemplary configuration in the case where one communication apparatus 101 operates as a repeater is illustrated in FIG. 5. In FIG. 5, the communication apparatus 101-*b* is operating as a repeater.

That is, the main system unit 121 of the communication apparatus 101-*b* is not in operation, and the bypass controller 112 is in the state illustrated in FIG. 2B. The communication apparatus 101-*b* operating as a repeater passes the received communication packets, and does not perform processing (certain processing by the main system unit 121) of the communication packets.

Figure 6:
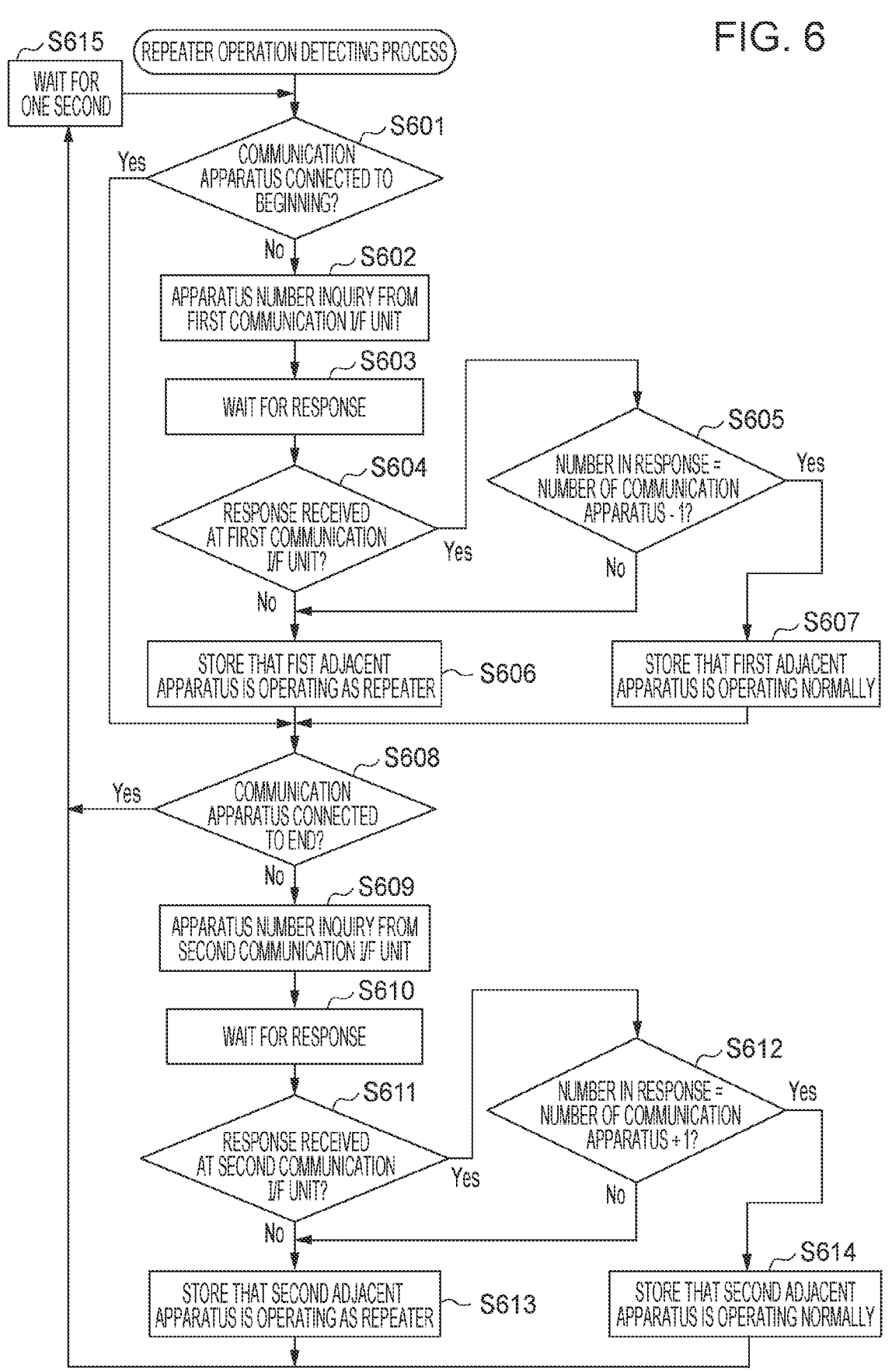
FIG. 6 illustrates a flowchart of a process performed by a detecting-side apparatus for detecting whether an adjacent communication apparatus is operating as a repeater.
Figure 7:
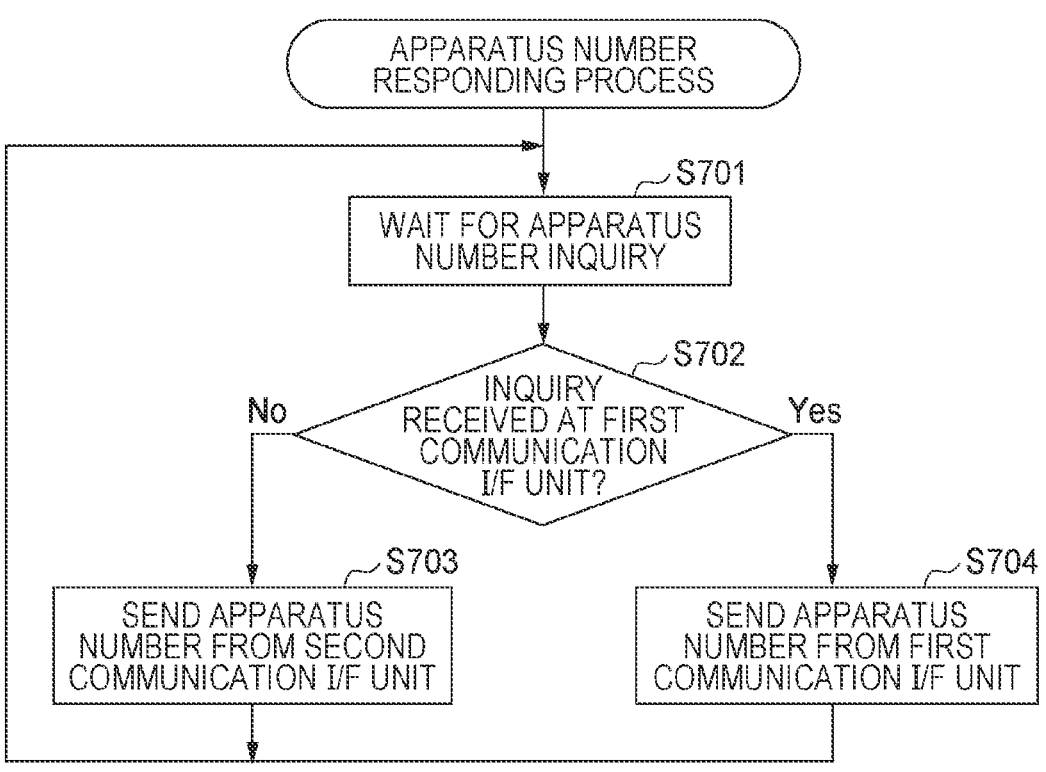
FIG. 7 illustrates a flowchart of a process performed by a detected-side apparatus for detecting whether an adjacent communication apparatus is operating as a repeater.

Procedure for Detecting Whether Adjacent Communication Apparatus is Operating as Repeater Next, a procedure for each communication apparatus 101 to detect whether an adjacent communication apparatus is operating as a repeater will be described with reference to FIGS. 6 and 7. FIG. 6 illustrates a flowchart of a process performed by a detecting-side apparatus, and FIG. 7 illustrates a flowchart of a process performed by a detected-side apparatus, for detecting whether an adjacent communication apparatus is operating as a repeater.

The outline of a procedure for detecting whether an adjacent communication apparatus is operating as a repeater will be described with reference to FIGS. 4 and 5. In FIGS. 4 and 5, the apparatus number "1" is set to the communication apparatus 101-*a*, "2" to the communication apparatus 101-*b*, and "3" to the communication apparatus 101-*c*. The detecting-side apparatus is assumed to be the communication apparatus 101-*a*. The communication apparatus 101-*a* (detecting-side apparatus) asks the adjacent communication apparatus 101-*b* (detected-side apparatus) for the apparatus number. If the communication apparatus 101-*b* is operating normally as in FIG. 4, the communication apparatus 101-*a* receives a response including the apparatus number "2" of the communication apparatus 101-*b*. That is, the communication apparatus 101-*a* receives a response including the apparatus number that is different from the apparatus number "1" of the communication apparatus 101-*a* by one. In contrast, when the communication apparatus 101-*b* is operating as a repeater as in FIG. 5 and the communication apparatus 101-*c* adjacent to the communication apparatus 101-*b* (detected-side apparatus) is operating normally, the communication apparatus 101-*a* receives a response including the apparatus number "3" of the communication apparatus 101-*c*. That is, the communication apparatus 101-*a* receives a response including the apparatus number that is different from the apparatus number of the communication apparatus 101-*a* by more than one. As a result, the communication apparatus 101-*a* is able to detect that the communication apparatus 101-*b* is operating as a repeater.

Referring to FIG. 6, a process performed by a communication apparatus 101 as a detecting-side apparatus for detecting whether an adjacent communication apparatus is operating as a repeater (a repeater operation detecting process) will be described.

The operation confirmation controller 106 determines whether the communication apparatus 101 is connected to the beginning of a daisy chain (S601). That is, the operation confirmation controller 106 determines whether the communication apparatus 101 is the communication apparatus 101-*a* closest to the time server 403 in a daisy chain in the image communication system 10 in FIG. 4. The determination may be conducted by checking the apparatus number of the communication apparatus 101, which is set in the apparatus number storage unit 111 when the image communication system 10 is set. If the communication apparatus 101 is connected to the beginning (Yes in S601), the process proceeds to S608. If the communication apparatus 101 is not connected to the beginning (No in S601), the operation confirmation controller 106 sends an apparatus number inquiry (inquiry packet) from the first communication I/F unit 113-1 (S602), and waits for a response (response packet) (S603).

If no response is received within a certain time (No in S604), the operation confirmation controller 106 detects that the communication apparatus 101 (first adjacent apparatus) connected on the first communication I/F unit 113-1 side is operating as a repeater, and stores the detection result (S606). If a response is received within a certain time (Yes in S604), the operation confirmation controller 106 checks whether the apparatus number included in the response is the same as the number that is one less than the apparatus number of the communication apparatus 101 (S605). If the apparatus number included in the response is the same as the number that is one less than the apparatus number of the communication apparatus 101 (Yes in S605), the operation confirmation controller 106 detects that the first adjacent apparatus is operating normally, and stores the detection result (S607). If the apparatus number included in the response is not the same as the number that is one less than the apparatus number of the communication apparatus 101 (No in S605), the operation confirmation controller 106 detects that the first adjacent apparatus is operating as a repeater, and stores the detection result (S606).

Next, the operation confirmation controller 106 determines whether the communication apparatus 101 is connected to the end of a daisy chain (S608). That is, the operation confirmation controller 106 determines whether the communication apparatus 101 is the communication apparatus 101-c farthest from the time server 403 in a daisy chain in the image communication system 10 in FIG. 4 (whether nothing is connected to the second communication I/F unit 113-2). The determination may be conducted by checking the apparatus number of the communication apparatus 101, which is set in the apparatus number storage unit 111 when the image communication system 10 is set. If the communication apparatus 101 is connected to the end (Yes in S608), the process proceeds to S615. If the communication apparatus 101 is not connected to the end (No in S608), the operation confirmation controller 106 sends an apparatus number inquiry (inquiry packet) from the second communication I/F unit 113-2 (S609), and waits for a response (response packet) (S610).

If no response is received within a certain time (No in S611), the operation confirmation controller 106 detects that the communication apparatus 101 (second adjacent apparatus) connected on the second communication I/F unit 113-2 side is operating as a repeater, and stores the detection result (S613). If a response is received within a certain time (Yes in S611), the operation confirmation controller 106 checks whether the apparatus number included in the response is the same as the number that is one greater than the apparatus number of the communication apparatus 101 (S612). If the apparatus number included in the response is the same as the number that is one greater than the apparatus number of the communication apparatus 101 (Yes in S612), the operation confirmation controller 106 detects that the second adjacent apparatus is operating normally, and stores the detection result (S614). If the apparatus number included in the response is not the same as the number that is one greater than the apparatus number of the communication apparatus 101 (No in S612), the operation confirmation controller 106 detects that the second adjacent apparatus is operating as a repeater, and stores the detection result (S613). After S613 or S614, the process proceeds to S615. In S615, the operation confirmation controller 106 waits for one second, and then the process returns to S601.

Referring next to FIG. 7, a process performed by a communication apparatus 101 as a detected-side apparatus for detecting whether an adjacent communication apparatus is operating as a repeater (an apparatus number responding process) will be described. Note that the communication apparatus 101 does not perform the responding process when the main system unit 121 is not in operation.

The operation confirmation controller 106 waits for the receipt of an apparatus number inquiry (inquiry packet) (S701). On receipt of the inquiry, the operation confirmation controller 106 checks whether the inquiry has been received by the first communication I/F unit 113-1 (S702). When the inquiry has been received by the first communication I/F unit 113-1 (Yes in S702), the operation confirmation controller 106 sends the apparatus number of the communication apparatus 101, which is stored in the apparatus number storage unit 111, from the first communication I/F unit 113-1 (S704). In contrast, when the inquiry has not been received by the first communication I/F unit 113-1 (that is, when the inquiry has been received by the second communication I/F unit 113-2) (No in S702), the operation confirmation controller 106 sends the apparatus number of the communication apparatus 101 from the second communication I/F unit 113-2 (S703). After S703 or S704, the process returns to S701.

In this manner, the communication apparatus 101 performs the process illustrated in FIG. 6 at the time of an inquiry for repeater operation detection, and performs the process illustrated in FIG. 7 at the time of a response in response to the inquiry (when the main system unit 121 is in operation). As a result, the communication apparatus 101 is able to determine whether each of the first adjacent apparatus and the second adjacent apparatus (another adjacent communication apparatus 101) is operating as a repeater. Although the individual communication apparatuses 101 are assigned apparatus numbers that are different by one in the present embodiment, the numbering rule is not limited to this rule. It is only necessary that the individual communication apparatuses 101 be assigned different identification numbers so as to be able to detect whether an adjacent communication apparatus is operating as a repeater.

Time Synchronization Procedure Based on PTP

Figure 8:
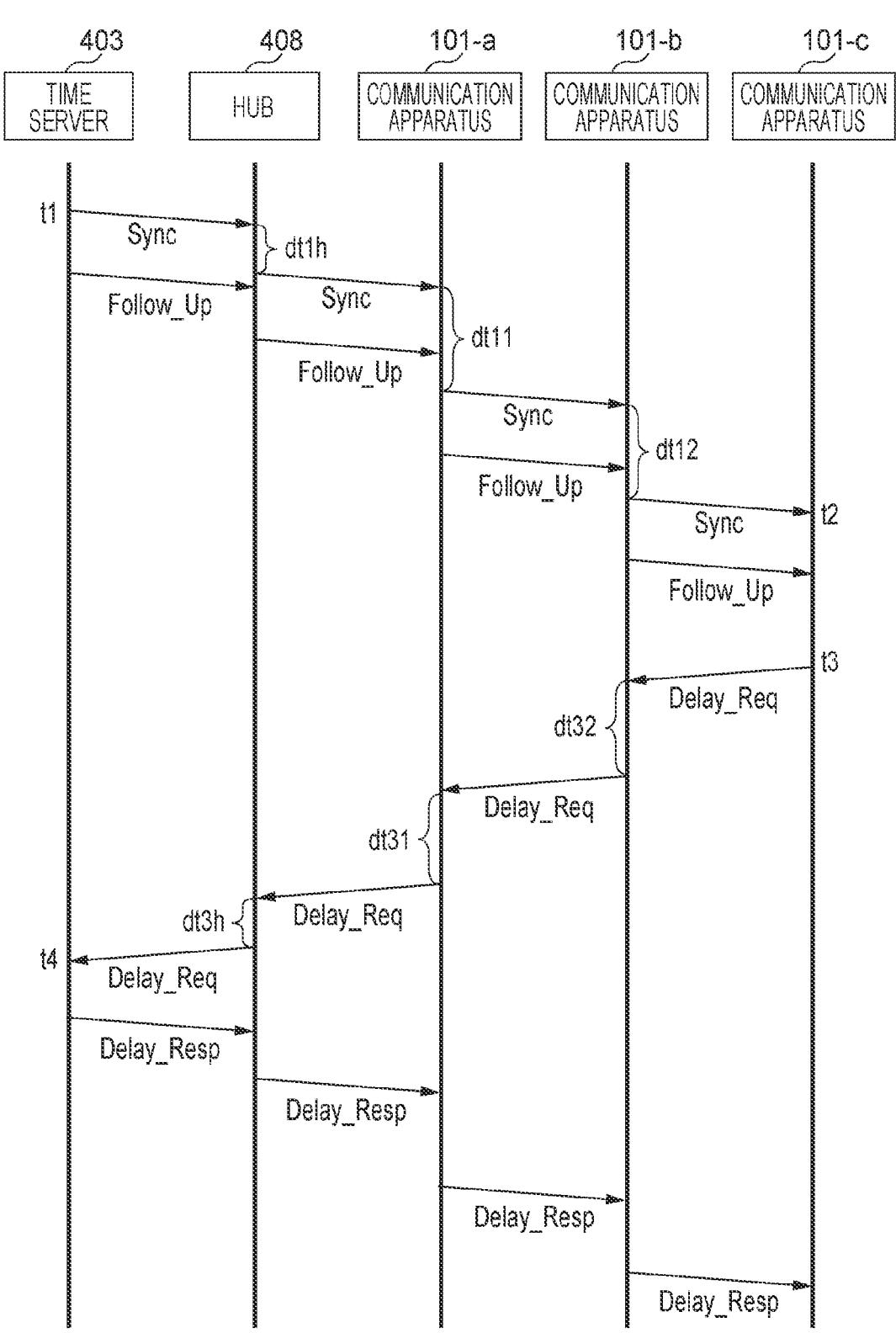
FIG. 8 is a sequence diagram illustrating a time synchronization procedure based on PTP.

In the present embodiment, the communication apparatuses 101-a to 101-c each execute a time synchronization procedure based on PTP. Referring to FIG. 8, a time synchronization procedure based on PTP will be described. FIG. 8 is a sequence diagram illustrating a time synchronization procedure based on PTP. In this example, it is assumed that the communication apparatuses 101-a to 110-c are operating normally in the image communication system 10 illustrated in FIG. 4, and a time synchronization procedure of the clock unit 114 of the communication apparatus 101-c will be described. Note that the communication apparatus 101-a and the communication apparatus 101-b operating normally can also perform the time synchronization of the clock unit 114 according to the same procedure.

In FIG. 8, the time server 403 sends a Sync packet to the hub 408 at time t1. Next, the time server 403 sends a Follow_Up packet including time t1 to the hub 408 in order to report the accurate sending time (time t1) of the Sync packet. The hub 408 receives the Sync packet and the Follow_Up packet, and forwards (relays) these packets to the communication apparatus 101-a. As previously described, the hub 408 has the function of a transparent clock (TC) of PTP to obtain the time (residence time) taken to relay the Sync packet using hardware, and adds the obtained time to the value of a correction field of the to-be-sent Sync packet.

Figure 11:
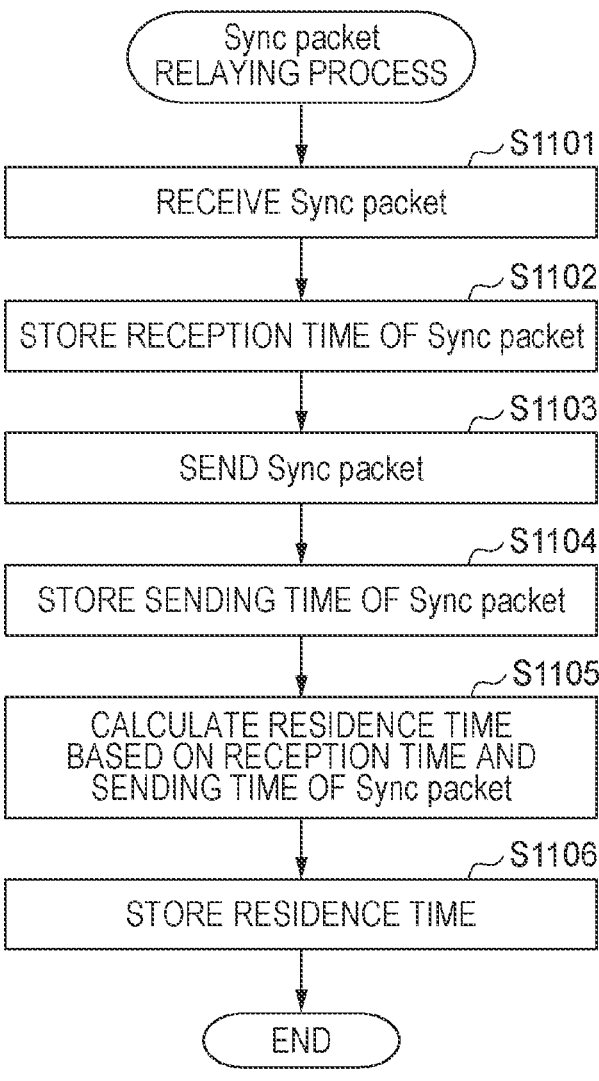
FIG. 11 illustrates a flowchart of a Sync packet relaying process performed by each communication apparatus.

On receipt of the Sync packet by the first communication I/F unit 113-1, the communication apparatus 101-*a* relays the Sync packet. FIG. 11 is a flowchart illustrating a Sync packet relaying process performed by each communication apparatus 101.

In FIG. 11, the PTP controller 108 receives a Sync packet from the first communication I/F unit 113-1 (S1101). The reception time of the Sync packet is recorded in the clock unit 114, and the PTP controller 108 reads the reception time of the Sync packet from the clock unit 114 and stores the reception time (S1102). The PTP controller 108 sends the received Sync packet from the second communication I/F unit 113-2 (S1103). The sending time of the Sync packet is recorded in the clock unit 114, and the PTP controller 108 reads the sending time of the Sync packet from the clock unit 114 and stores the sending time (S1104). The PTP controller 108 calculates the residence time of the Sync packet by subtracting the reception time of the Sync packet (S1102) from the sending time of the Sync packet (S1104) (S1105). The PTP controller 108 stores the calculated residence time (S1106).

In FIG. 8, in the case of the communication apparatus 101-*a*, the PTP controller 108 of the communication apparatus 101-*a* calculates the residence time dt11 of the Sync packet.

On receipt of a Follow_Up packet by the first communication I/F unit 113-1, the PTP controller 108 of the communication apparatus 101-*a* relays the Follow_Up packet.

Figure 12:
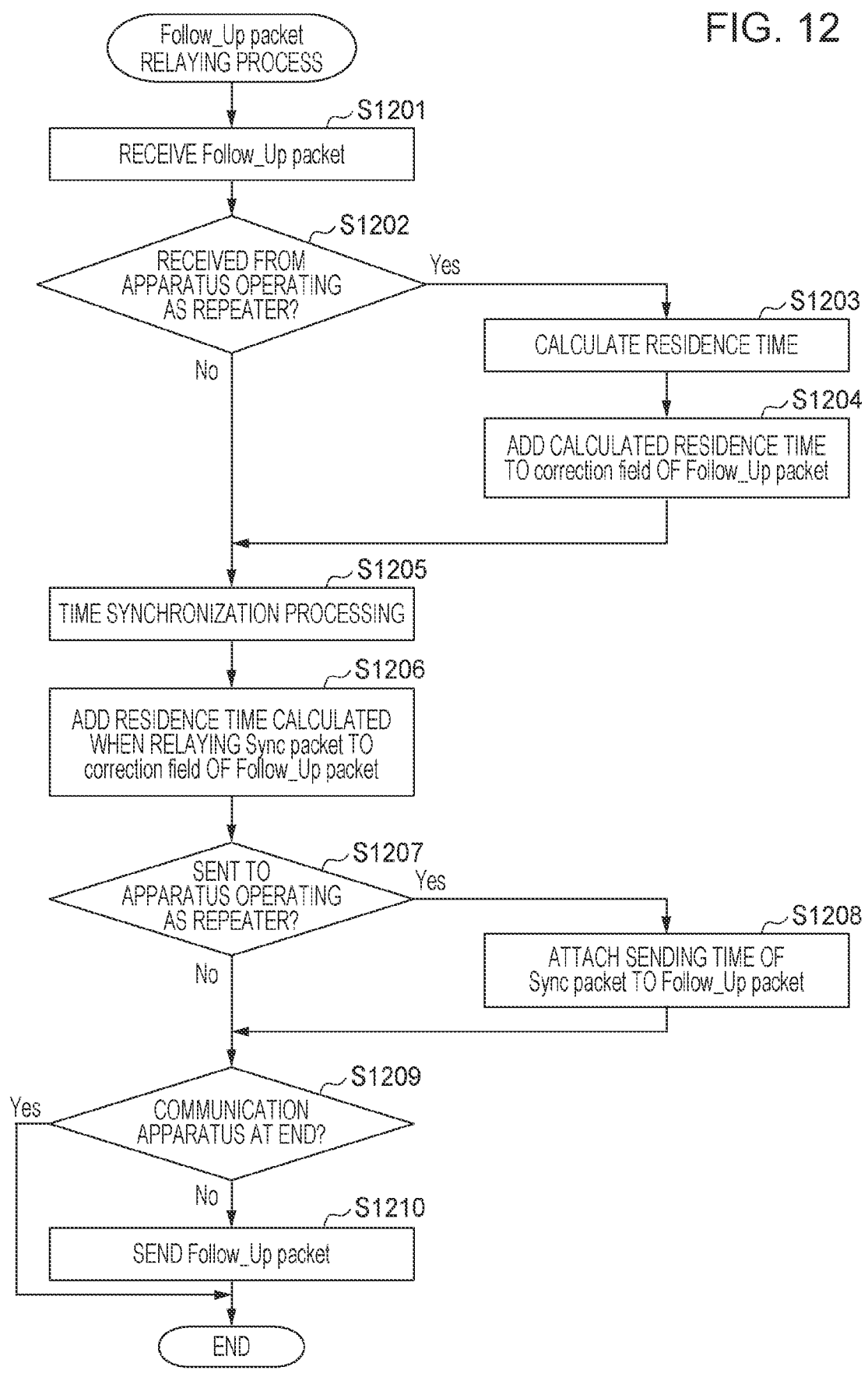
FIG. 12 is a flowchart of a Follow_Up packet relaying process performed by each communication apparatus.

FIG. 12 illustrates a flowchart of a Follow_Up packet relaying process performed by each communication apparatus 101.

In FIG. 12, the PTP controller 108 receives a Follow_Up packet from the first communication I/F unit 113-1 (S1201). The operation confirmation controller 106 checks whether another communication apparatus 101 (first adjacent apparatus) connected to the first communication I/F unit 113-1 is operating as a repeater (S1202). In the example in FIG. 8, because the communication apparatus 101-*a* receives a Follow_Up packet from the hub 408 (No in S1202), the process proceeds to S1205. The time synchronization processing in S1205 will be described later. The PTP controller 108 adds the residence time of the Sync packet, calculated in S1105 in FIG. 11, to the correction field of the Follow_Up packet (S1206).

Next, the operation confirmation controller 106 checks whether another communication apparatus 101 (second adjacent apparatus) connected to the second communication I/F unit 113-2 is operating as a repeater (S1207). In the example in FIG. 8, the communication apparatus 101-*b*, to which the Follow_Up packet from the communication apparatus 101-*a* is sent, is not operating as a repeater (No in S1207), and the communication apparatus 101-*a* is not the apparatus connected to the end of a daisy chain (No in step S1209). The process proceeds to S1210, where the PTP controller 108 sends the Follow_Up packet from the second communication I/F unit 113-2.

Note that the residence time of the Sync packet in the apparatus is included in the to-be-sent Sync packet in the time server 403, whereas the residence time of the Sync packet is included in the to-be-sent Follow_Up packet in the communication apparatus 101.

Referring back to FIG. 8, the communication apparatus 101-*b*, which has received the Sync packet and the Follow_Up packet from the communication apparatus 101-*a*, performs the same or similar processes as the communication apparatus 101-*a*. That is, by performing the processes illustrated in FIGS. 11 and 12, the communication apparatus 101-*b* relays the Sync packet and the Follow_Up packet received from the communication apparatus 101-*a* to the communication apparatus 101-*c*. As illustrated in FIG. 8, the residence time of the Sync packet in the communication apparatus 101-*b* is time dt12.

Figure 13:
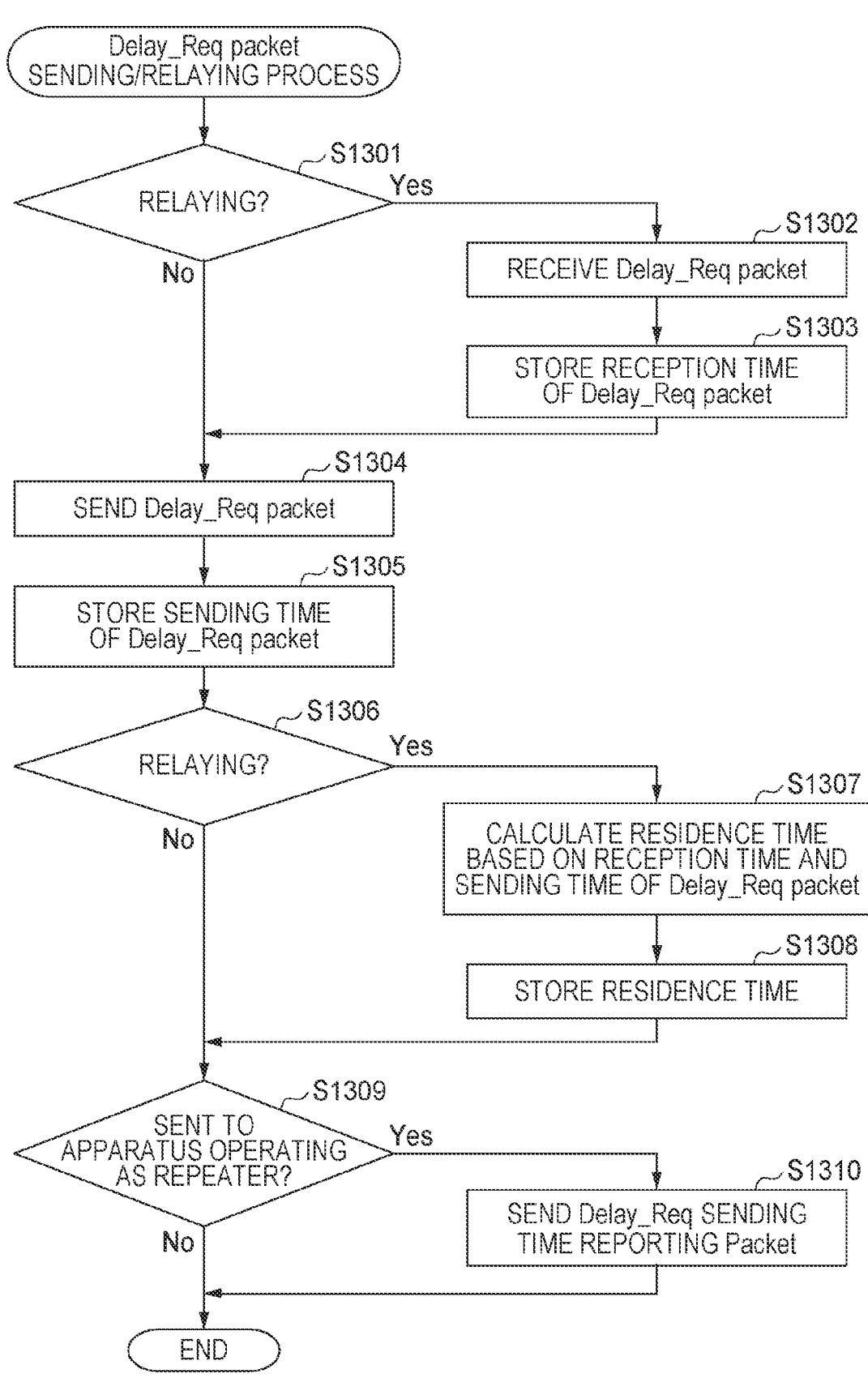
FIG. 13 is a flowchart of a Delay_Req packet sending/relaying process performed by each communication apparatus.

The communication apparatus 101-*c* receives the Sync packet and the Follow_up packet from the communication apparatus 101-*b*. The reception time of the Sync packet in the communication apparatus 101-*c* is time t2. The communication apparatus 101-*c* does not send the received packets to another communication apparatus. In contrast, the communication apparatus 101-*c* sends a Delay_Req packet from the first communication I/F unit 113-1. The communication apparatus 101-*b* receives the Delay_Req packet from the communication apparatus 101-*c*, and relays the received Delay_Req packet to the communication apparatus 101-*a*. FIG. 13 illustrates a flowchart of a Delay_Req packet sending/relaying process performed by each communication apparatus 101.

In FIG. 13, the PTP controller 108 determines whether to send or relay a Delay_Req packet (S1301). In the case of relaying (Yes in S1301), the PTP controller 108 receives a Delay_Req packet from the second communication I/F unit 113-2 (S1302). The clock unit 114 has recorded the reception time of the Delay_Req packet; thus, the PTP controller 108 reads the reception time and stores the reception time (S1303).

After S1303 or when not in the case of relaying a Delay_Req packet (No in S1301), the PTP controller 108 sends a Delay_Req packet from the first communication I/F unit 113-1 (S1304). The clock unit 114 has recorded the sending time of the Delay_Req packet; thus, the PTP controller 108 reads the sending time and stores the sending time (S1305).

Next, the PTP controller 108 again determines whether to send or relay the Delay_Req packet (S1306). In the case of relaying (Yes in S1306), the PTP controller 108 calculates the residence time in the communication apparatus 101 based on the reception time of the Delay_Req packet (S1303) and the sending time of the Delay_Req packet (S1305) (S1307). In the example in FIG. 8, the communication apparatus 101-*b* calculates the residence time dt32, and the communication apparatus 101-*a* calculates the residence time dt31. Then, the PTP controller 108 stores the residence time (S1308).

After S1308 or when not in the case of relaying the Delay_Req packet (No in S1306), the process proceeds to S1309. In S1309, the operation confirmation controller 106 checks whether the communication apparatus 101 (first adjacent apparatus) connected to the first communication I/F unit 113-1, which sends the Delay_Req packet, is operating as a repeater. In the example in FIG. 8, the communication apparatuses 101-*a* and 101-*b* are operating normally (No in S1309), and the process ends.

Referring back to FIG. 8, the hub 408 relays the Delay_Req packet received from the communication apparatus 101-*a* to the time server 403. At that time, the hub 408 obtains the residence time dt3h in the hub 408, and adds the residence time to the correction field of the Delay_Req packet.

On receipt of the Delay_Req packet from the hub 408, the time server 403 sends a Delay_Resp packet containing the reception time t4 of the Delay_Req packet and the value in the correction field of the Delay_Req packet. In the example in FIG. 8, the time server 403 sends a Delay_Resp packet addressed to the communication apparatus 101-*c*.

The hub 408 relays the received Delay_Resp packet to the communication apparatus 101-*a*.

Figure 14:
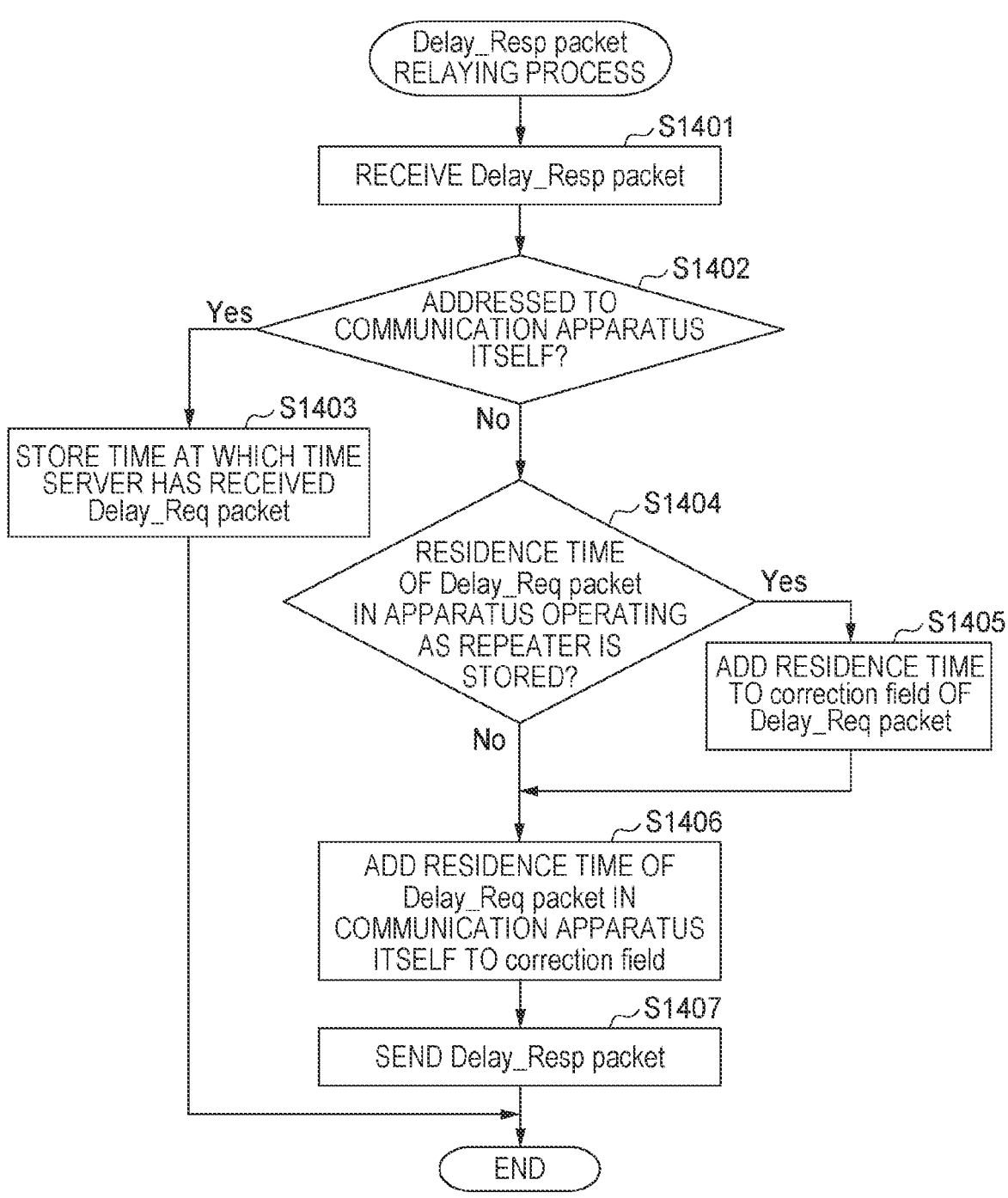
FIG. 14 is a flowchart of a Delay_Resp packet relaying process performed by each communication apparatus.

On receipt of the Delay_Resp packet by the first communication I/F unit 113-1, the communication apparatus 101-*a* relays the Delay_Resp packet. FIG. 14 illustrates a flowchart of a Delay_Resp packet relaying process performed by each communication apparatus 101.

In FIG. 14, the PTP controller 108 receives a Delay_Resp packet by the first communication I/F unit 113-1 (S1401), and checks whether the received packet is a Delay_Resp packet addressed to the communication apparatus 101 (S1402). In the example in FIG. 8, the Delay_Resp packet is a packet addressed to the communication apparatus 101-*c*. Therefore, the communication apparatus 101-*a* and the communication apparatus 101-*b* each determine that the received packet is not addressed to the communication apparatus 101-*a* and the communication apparatus 101-*b*, respectively (No in S1402), and the process proceeds to step S1404. In the example in FIG. 8, because there is no communication apparatus 101 operating as a repeater (No in S1404), the process proceeds to S1406. The communication apparatus 101-*a* and the communication apparatus 101-*b* each add the residence times (dt31 and dt32) of the Delay_Req packet to the correction field of the Delay_Resp packet, and send (relay) the packet (S1406 and S1407).

In the meantime, the communication apparatus 101-*c* determines that the received packet is addressed to the communication apparatus 101-*c* (Yes in S1402), and the process proceeds to S1403. In S1403, the communication apparatus 101-*c* stores the time at which the time server 403 has received the Delay_Req packet (time t4), and the process ends.

Based on such time information obtained by sending and receiving the Sync packet, the Follow_Up packet, the Delay_Req packet, and the Delay_Resp packet, a time difference (offset) for performing time synchronization is calculated. Specifically, the following time information is used:

the time at which the time server 403 has sent the Sync packet: t1;

the time at which the communication apparatus 101-*c* has received the Sync packet: t2;

the time at which the communication apparatus 101-*c* has sent the Delay_Req packet: t3;

the time at which the time server 403 has received the Delay_Req packet: t4;

the residence time of the Sync packet in the hub 408: dt1h;

the residence time of the Sync packet in the communication apparatus 101-*a*: dt11;

the residence time of the Sync packet in the communication apparatus 101-*b*: dt12;

the residence time of the Delay_Req packet in the communication apparatus 101-*b*: dt32;

the residence time of the Delay_Req packet in the communication apparatus 101-*a*: dt31; and the residence time of the Delay_Req packet in the hub 408: dt3h.

Using the time information, the transmission delay between the time server 403 and the communication apparatus 101-*c* (delay of one-way communication) is obtained as equation (1):

$$\text{transmission delay} = ((t2-(t1+dt12+dt11+dt1h))+((t4-dt32-dt31-dt3h)-t3))/2 \qquad (1)$$

In addition, the time difference between the time server 403 and the communication apparatus 101-*c* is obtained as equation (2):

$$\text{time difference} = (t2-(t1+dt12+dt11+dt1h))-\text{transmission delay} \qquad (2)$$

The time difference obtained by equation (2) is the time deviation from the time server 403 at the communication apparatus 101-*c*. The PTP controller 108 of the communication apparatus 101-*c* corrects the clock unit 114 using the time difference. As a result, the communication apparatus 101-*c* is now in a state where its time is synchronized with the time server 403. Although the case where the communication apparatus 101-*c* sends Delay_Req has been described here, the other communication apparatuses 101-*a* and 101-*b* can similarly send Delay_Req and receive Delay_Resp to obtain the transmission delay.

In PTP, time measurement is performed at all times using Sync packets, Follow_Up packets, Delay_Req packets, and Delay_Resp packets, as described above. As mentioned above, the calculation of the time difference (equation (2)) for performing time synchronization is performed after the transmission delay (equation (1)) is obtained. In other words, the calculations are performed at different time points. Therefore, the sending times (t1 and t3) and the reception times (t2 and t4) used in the calculation of the transmission delay and the sending times (t1 and t3) and the reception times (t2 and t4) used in the calculation of the time difference are different values. Similarly, because the residence time in the communication apparatus 101 is also fluctuating, the residence times (dt11, dt12, dt32, and dt31) used in the calculation of the transmission delay and the residence times (dt11, dt12, dt32, and dt31) used in the calculation of the time difference are different values.

If all communication apparatuses that are connected to form a daisy chain are operating normally, time synchronization can be performed based on the above-described time synchronization procedure based on PTP. However, if there is a communication apparatus operating as a repeater, the communication apparatus operating as a repeater does not measure its packet residence time in the apparatus. This may deteriorate the accuracy of time synchronization of a communication apparatus connected beyond the communication apparatus operating as a repeater. To that end, a communication apparatus according to the present embodiment performs the following time synchronization procedure when another adjacent-connected communication apparatus is operating as a repeater.

Time Synchronization Procedure when there is Apparatus Operating as Repeater

Figure 9:
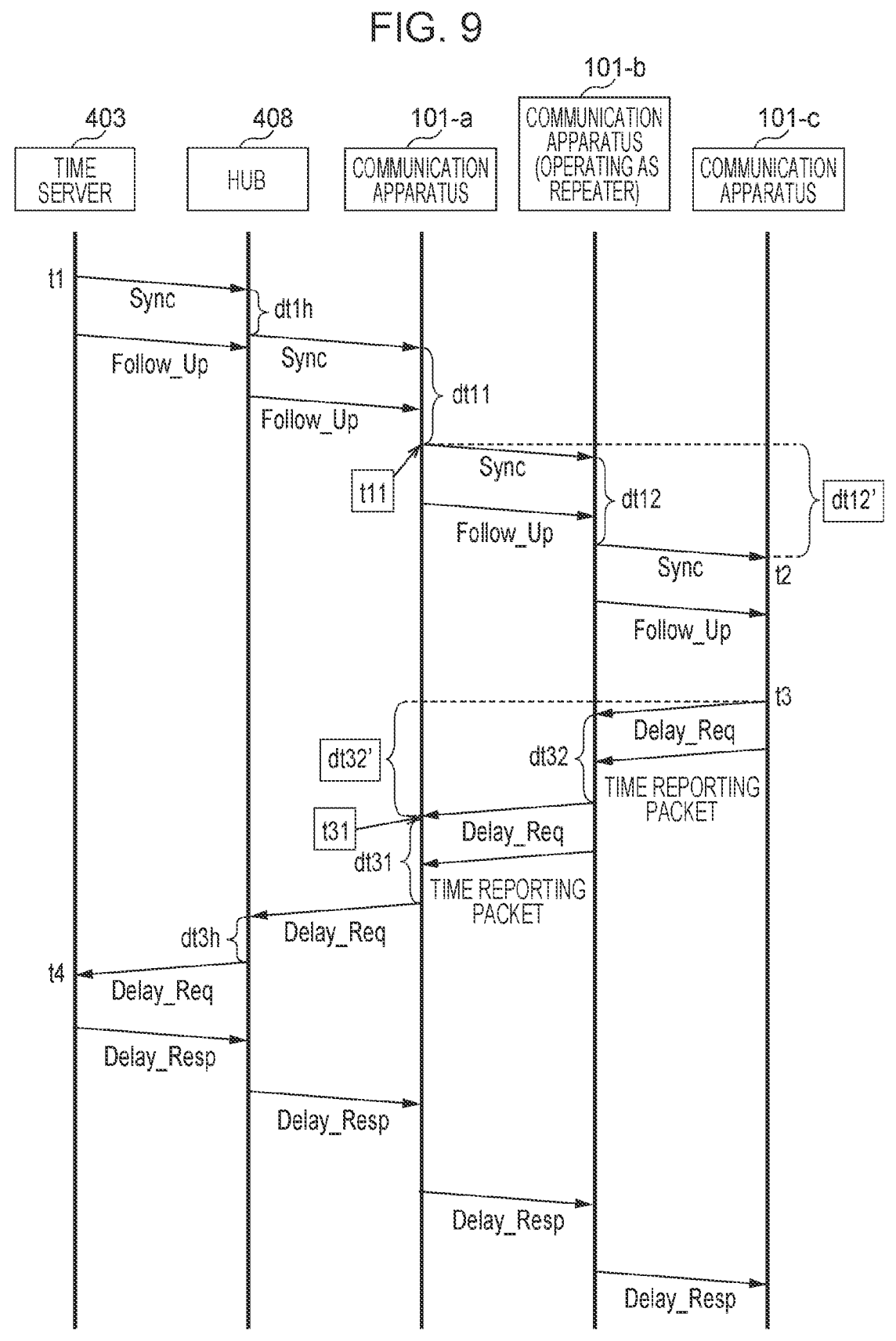

As illustrated in FIG. 5, suppose that the main system unit 121 of the communication apparatus 101-*b* has stopped, and the communication apparatus 101-*b* has become operating as a repeater. Referring to FIG. 9, a time synchronization procedure of the clock unit 114 of the communication apparatus 101-*c* when the communication apparatus 101-*b* is operating as a repeater will be described. FIG. 9 is a sequence diagram illustrating a time synchronization procedure when there is a communication apparatus operating as a repeater. It is assumed that the communication apparatuses 101-*a* to 101-*c* have performed the processes illustrated in FIGS. 6 and 7, and the communication apparatus 101-*a* and the communication apparatus 101-*c* have detected that the adjacent communication apparatus 101-*b* is operating as a repeater.

As illustrated in FIG. 2B, the communication apparatus 101-*b* operating as a repeater is configured to use the buffer 201 when relaying packets and to send one packet at a time, which causes delays and fluctuations in relaying. Therefore, even if the bypass controller 112 is in the bypass state as illustrated in FIG. 2B, the residence times dt12' and dt32' in the communication apparatus 101-*b* operating as a repeater occur, as illustrated in FIG. 9. Because the communication apparatus 101-*c* is unable to obtain these two residence times, the problem that the synchronized time becomes shifted or fluctuating occurs.

In the present embodiment, the two residence times dt12' and dt32' in the communication apparatus 101-*b* are calculated by the following procedure performed by the communication apparatus 101-*a* and the communication apparatus 101-*c*, which are on both sides of the communication apparatus 101-*b* operating as a repeater. Using the residence times dt12' and dt32' instead of dt12 and dt32, the time difference for time synchronization can be calculated.

Procedure for Calculating Residence Time Dt12'

To calculate the residence time dt12', unlike the time synchronization procedure based on the normal PTP, the communication apparatus 101-*a* attaches the sending time of the Sync packet that the communication apparatus 101-*a* has sent to the communication apparatus 101-*b* to the Follow_Up packet, and sends it to the communication apparatus 101-*b*. Accordingly, a region containing the sending time of the Sync packet is newly added to the Follow_Up packet according to the present embodiment. FIG. 16 illustrates an exemplary format of the Follow_Up packet according to the present embodiment. In FIG. 16, the sending time of the Sync packet is contained in the shaded portions.

The operation of the communication apparatus 101-*a* and the communication apparatus 101-*c* will be described with reference to the flowchart of the Follow_Up packet relaying procedure illustrated in FIG. 12. The descriptions of steps in FIG. 12 that have already been described earlier are omitted.

First, the operation of the communication apparatus 101-*a* will be described. In S1207, because the communication apparatus 101-*b* to which the Follow_Up packet is to be sent is operating as a repeater (Yes in S1207), the process proceeds to S1208. In S1208, the PTP controller 108 of the communication apparatus 101-*a* attaches the sending time t11 of the Sync packet to the Follow_Up packet, and sends it to the communication apparatus 101-*b* (No in S1209, and S1210). That is, the PTP controller 108 of the communication apparatus 101-*a* writes the sending time t11 of the Sync packet in the shaded portions of the format of the Follow_Up packet illustrated in FIG. 16, and sends it.

Next, the operation of the communication apparatus 101-*c* will be described. The communication apparatus 101-*c* receives the Follow_Up packet relayed through the communication apparatus 101-*b* (Yes in S1202), and the process proceeds to S1203. In S1203, the PTP controller 108 of the communication apparatus 101-*c* calculates the residence time dt12' by subtracting the sending time t11 of the Sync packet, which is in the Follow_Up packet, from the reception time t2 of the Sync packet. The residence time dt12' is the residence time of the Sync packet in the communication apparatus 101-*b* operating as a repeater. Then, the PTP controller 108 of the communication apparatus 101-*c* adds the calculated residence time dt12' to the correction field of the Follow_Up packet (S1204), and the process proceeds to S1205. In S1205, the communication apparatus 101-*c* calculates the transmission delay (equation (1)) and the time difference (equation (2)), and performs time synchronization processing, as described above.

Procedure for Calculating Residence Time Dt32'

To calculate the residence time dt32', unlike the time synchronization procedure based on the normal PTP, the communication apparatus 101-*c* sends a packet for reporting the sending time of the Delay_Req packet to the communication apparatus 101-*b*. Thus, the packet for reporting the sending time of the Delay_Req packet (Delay_Req sending time reporting packet) is newly added. FIG. 17 illustrates an exemplary format of the Delay_Req sending time reporting packet according to the present embodiment. In FIG. 17, the sending time of the Delay_Req packet is contained in the shaded portions. In order to distinguish the packet from default PTP packets, a unique value is specified in the message type field of the packet.

Figure 15:
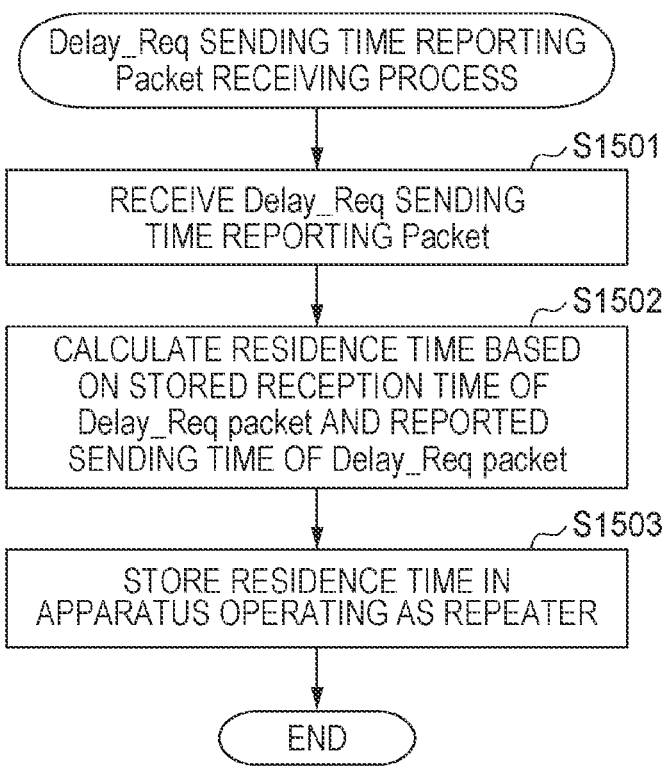
FIG. 15 is a flowchart of a Delay_Req sending time reporting packet receiving process performed by each communication apparatus.

The operation of the communication apparatus 101-*a* and the communication apparatus 101-*c* will be described with reference to the flowchart of the Delay_Req packet sending/relaying process, which is illustrated in FIG. 13, and FIG. 15. The descriptions of steps in FIG. 13 that have already been described earlier are omitted. FIG. 15 is a flowchart of a Delay_Req sending time reporting packet receiving process performed by each communication apparatus 101.

First, the operation of the communication apparatus 101-*c* will be described with reference to FIG. 13. In S1309, because the communication apparatus 101-*b* to which the Delay_Req packet is to be sent is operating as a repeater (Yes in S1309), the process proceeds to S1310. In S1310, the PTP controller 108 of the communication apparatus 101-*c* sends a Delay_Req sending time reporting packet from the first communication I/F unit 113-1 in order to report the sending time of the Delay_Req packet. That is, the PTP controller 108 of the communication apparatus 101-*c* writes the sending time t3 of the Delay_Req packet in the shaded portions of the Delay_Req sending time reporting packet illustrated in FIG. 17, and sends it.

Next, the operation of the communication apparatus 101-*a* will be described with reference to FIGS. 15 and 14. First, with reference to FIG. 15, the PTP controller 108 of the communication apparatus 101-*a* receives the Delay_Req sending time reporting packet relayed through the communication apparatus 101-*b* from the second communication I/F unit 113-2 (S1501). The PTP controller 108 calculates the residence time dt32' based on the reception time (time d31 in FIG. 9) of the Delay_Req packet, which is stored in S1303 in FIG. 13, and the time t3 reported by the received Delay_Req sending time reporting packet (S1502). The calculated residence time dt32' is the residence time of the Delay_Req packet in the communication apparatus 101-*b* operating as a repeater. Then, the PTP controller 108 of the communication apparatus 101-*a* stores the residence time (S1503).

Next, with reference to FIG. 14, the communication apparatus 101-*a* receives, from the time server 403, a Delay_Resp packet addressed to the communication apparatus 101-*c* (S1401, and No in S1402). Because the communication apparatus 101-*a* has received the residence time of the Delay_Req packet in the communication apparatus 101-*b* (S1404), the process proceeds to S1405. In S1405, the PTP controller 108 of the communication apparatus 101-*a* adds the residence time to the correction field of the Delay_Resp packet.

In this manner, the communication apparatus 101-*a* also attaches the sending time of the Sync packet when sending the Follow_Up packet to the communication apparatus 101-*b* which is adjacent and operating as a repeater. As a result, the communication apparatus 101-*c* which has received the Follow_Up packet from the communication apparatus 101-*b* operating as a repeater is able to calculate the residence time of the Sync packet in the communication apparatus 101-*b* operating as a repeater.

Moreover, when the communication apparatus 101-*c* has sent Delay_Req to the communication apparatus 101-*b* operating as a repeater, the communication apparatus 101-*c* sends a Delay_Req time reporting packet that reports the sending time of the Delay_Req packet. As a result, the communication apparatus 101-*a* which has received the Delay_Req packet from the communication apparatus 101-*b* also receives the Delay_Req time reporting packet, and thus is able to calculate the residence time of the Delay_Req packet in the communication apparatus 101-*b*.

As described thus far, according to the present embodiment, even in the case where a certain communication apparatus operates as a repeater after multiple daisy-chain connected communication apparatuses have been time-synchronized, the residence time of PTP packets (Sync packet and Delay_Req packet) in the communication apparatus can be measured. Thus, time synchronization processing can be performed without deteriorating the accuracy of time synchronization.

Although a region for containing the sending time of the Sync packet is provided in the Follow_Up packet in the present embodiment, the sending time can also be sent in a separate packet.

Second Embodiment

Figure 10:
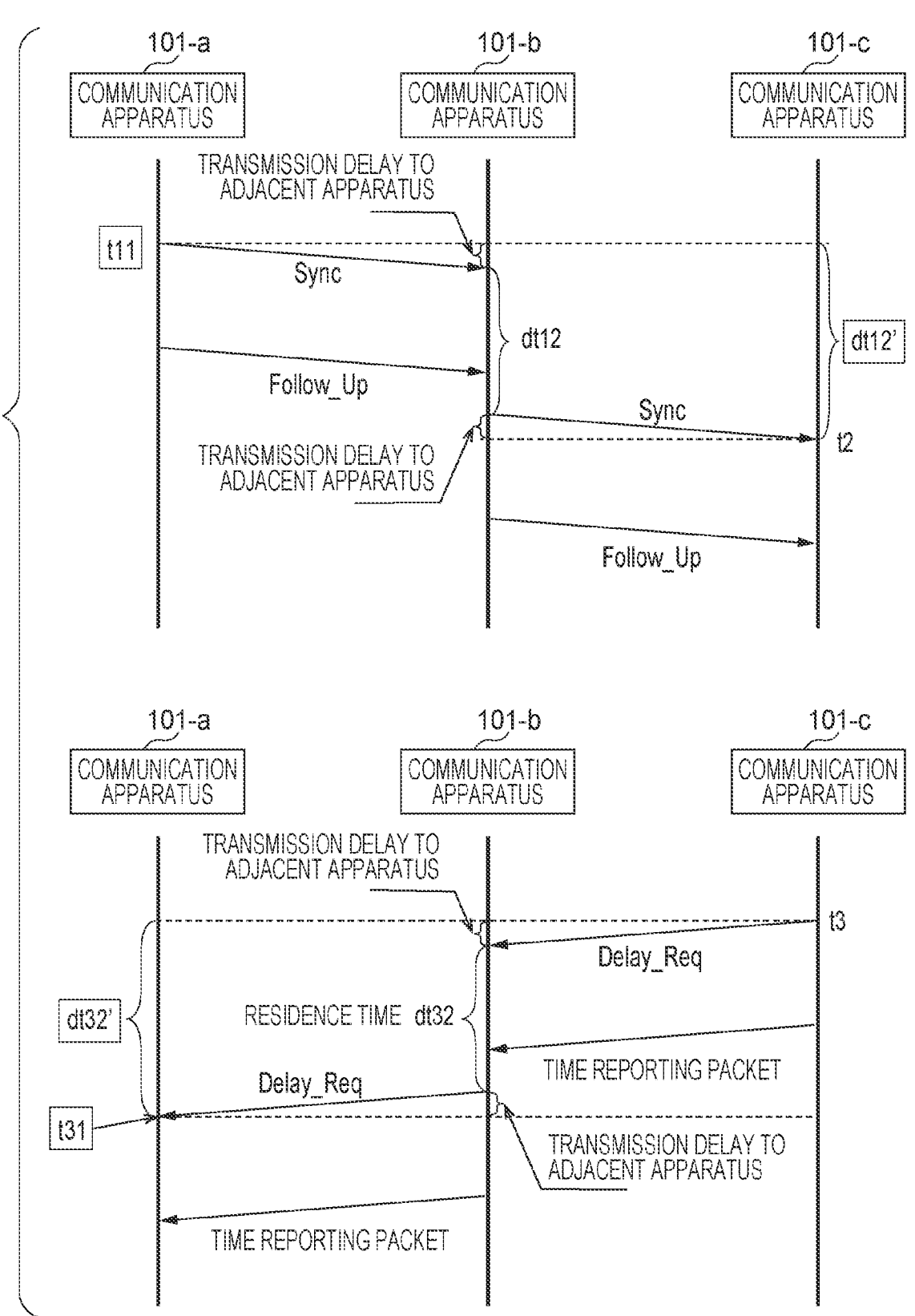
FIG. 10 includes conceptual diagrams of a transmission delay to an adjacent apparatus.

The residence times dt12' and dt32' in the communication apparatus 101-*b* operating as a repeater, which are calculated in the first embodiment, include a transmission delay to an adjacent apparatus. FIG. 10, which enlarges a part of FIG. 9, illustrates conceptual diagrams of a transmission delay to an adjacent apparatus in the residence times dt12' and dt32'. The transmission delay is the time it takes for a signal to pass through a physical network line, usually small enough compared to the accuracy of the time being synchronized. However, in the case where the transmission delay is larger than the required accuracy of time synchronization, there is a possibility that the transmission delay may become a problem. In the present embodiment, more accurate time synchronization is performed by calculating a transmission delay in the case where a packet is sent to an adjacent communication apparatus, and subtracting that delay from the residence time in a communication apparatus operating as a repeater.

Figure 18:
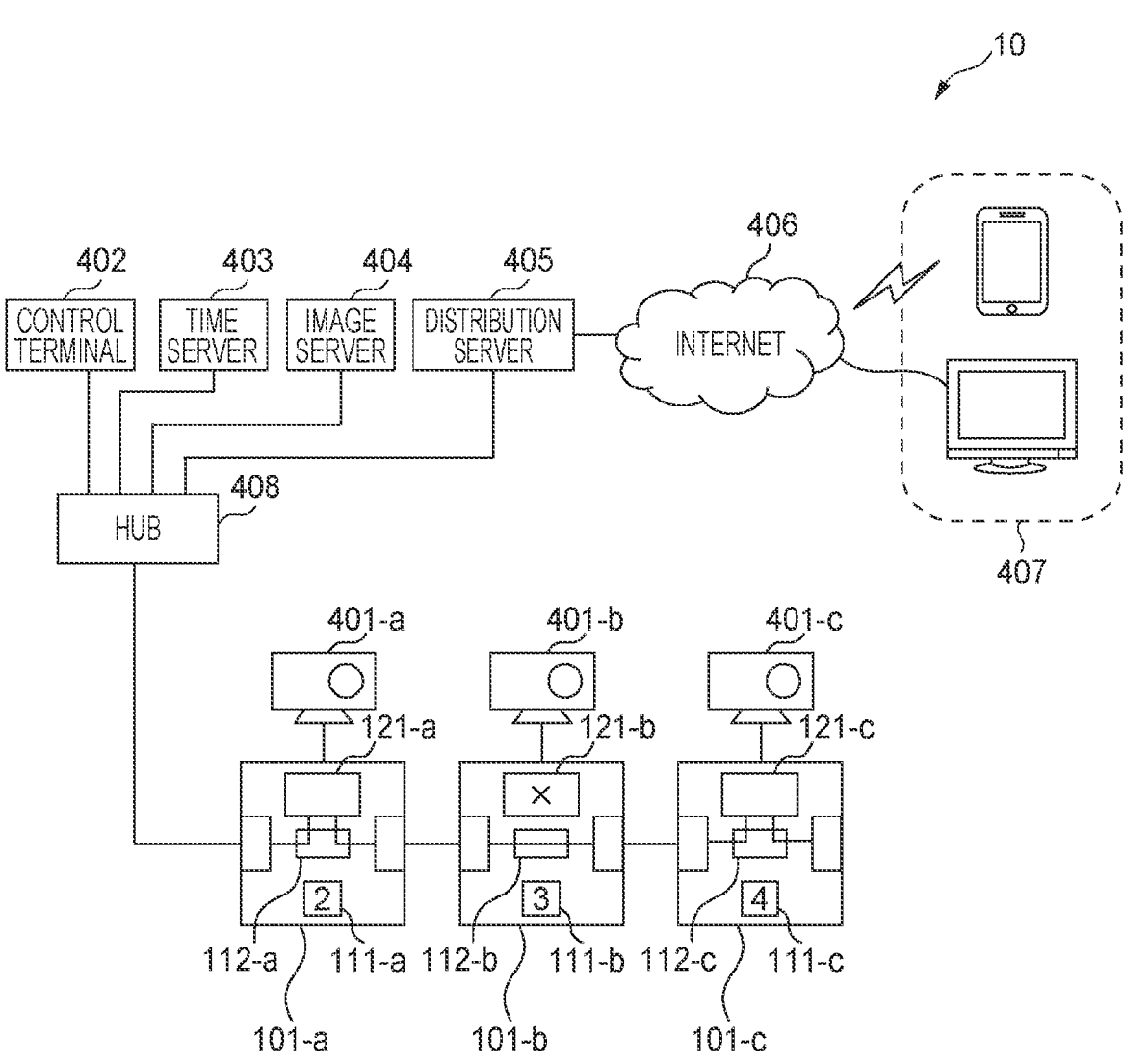
FIG. 18 illustrates an exemplary configuration of an image communication system according to a second embodiment.

FIG. 18 illustrates an exemplary configuration of the image communication system 10 according to a second embodiment. In FIG. 18, the time server 403, the hub 408, and the communication apparatuses 101-*a* to 101-*c* are assumed to be connected by the same or similar network lines. For example, in the case where the above components are connected by cables that have the same communication speed and the same length and that are of the same type, the transmission delay in sending a packet to an adjacent communication apparatus can be considered to be approximately the same. Therefore, the transmission delay time per line can be obtained by dividing the transmission delay time measured between the time server 403 and the communication apparatus 101 by the number of lines through which the packet passes up to the time server 403 (the number of lines that the packet passes through). That is, the transmission delay per line is calculated by the following equation:

transmission delay per line=transmission delay to time server/number of lines up to time server For example, the communication apparatus 101-*a* and the communication apparatus 101-*c* calculate and store the transmission delay per line while the adjacent communication apparatus 101-*b* is operating normally. After that, when the communication apparatus 101-*b* has become operating as a repeater, the communication apparatus 101-*a* and the communication apparatus 101-*c* subtract the stored transmission delay per line from the packet residence time in the communication apparatus 101-*b* calculated according to the first embodiment. As a result, the more accurate packet residence time in the communication apparatus 101-*b* can be calculated.

The above will be described specifically with reference to FIG. 18. The number of lines from the communication apparatus 101 to the time server 403 is "4" in the case of the communication apparatus 101-*c*. That is, the number of lines that the packet passes from the communication apparatus 101-*c* to the time server 403 is "4". Similarly, the number of lines up to the time server 403 is "3" in the case of the communication apparatus 101-*b*, and "2" in the case of the communication apparatus 101-*a*. In the present embodiment, the number of lines of each communication apparatus 101 is set as the apparatus number of each communication apparatus 101. For example, the apparatus number storage unit 111 can store the apparatus number when the image communication system 10 is constructed. Because the communication apparatuses 101-*a* to 101-*c* are daisy-chain connected, the number of lines up to the time server 403 is not identical among the communication apparatuses 101-*a* to 101-*c*, and is thus usable as the apparatus number.

If the communication apparatus 101-*b* is assumed to be operating as a repeater, the residence time of the Sync packet in the communication apparatus 101-*b* calculated by the communication apparatus 101-*c* is obtained by the following equation (3) using the residence time dt12' calculated in S1203 in FIG. 12:

$$\text{residence time of Sync packet} = dt12' - \text{transmission delay per line} \times 2 \tag{3}$$

As a result, as illustrated at the top of FIG. 10, the calculated residence time becomes a value closer to dt12.

Similarly, the residence time of the Delay_Req packet in the communication apparatus 101-*b* calculated by the communication apparatus 101-*a* is obtained by the following equation (4) using dt32' calculated in S1502 in FIG. 15:

$$\text{residence time of Delay\_Req packet} = dt32' - \text{transmission delay per line} \times 2 \tag{4}$$

As a result, as illustrated at the bottom of FIG. 10, the calculated residence time becomes a value closer to dt32.

Figure 19:
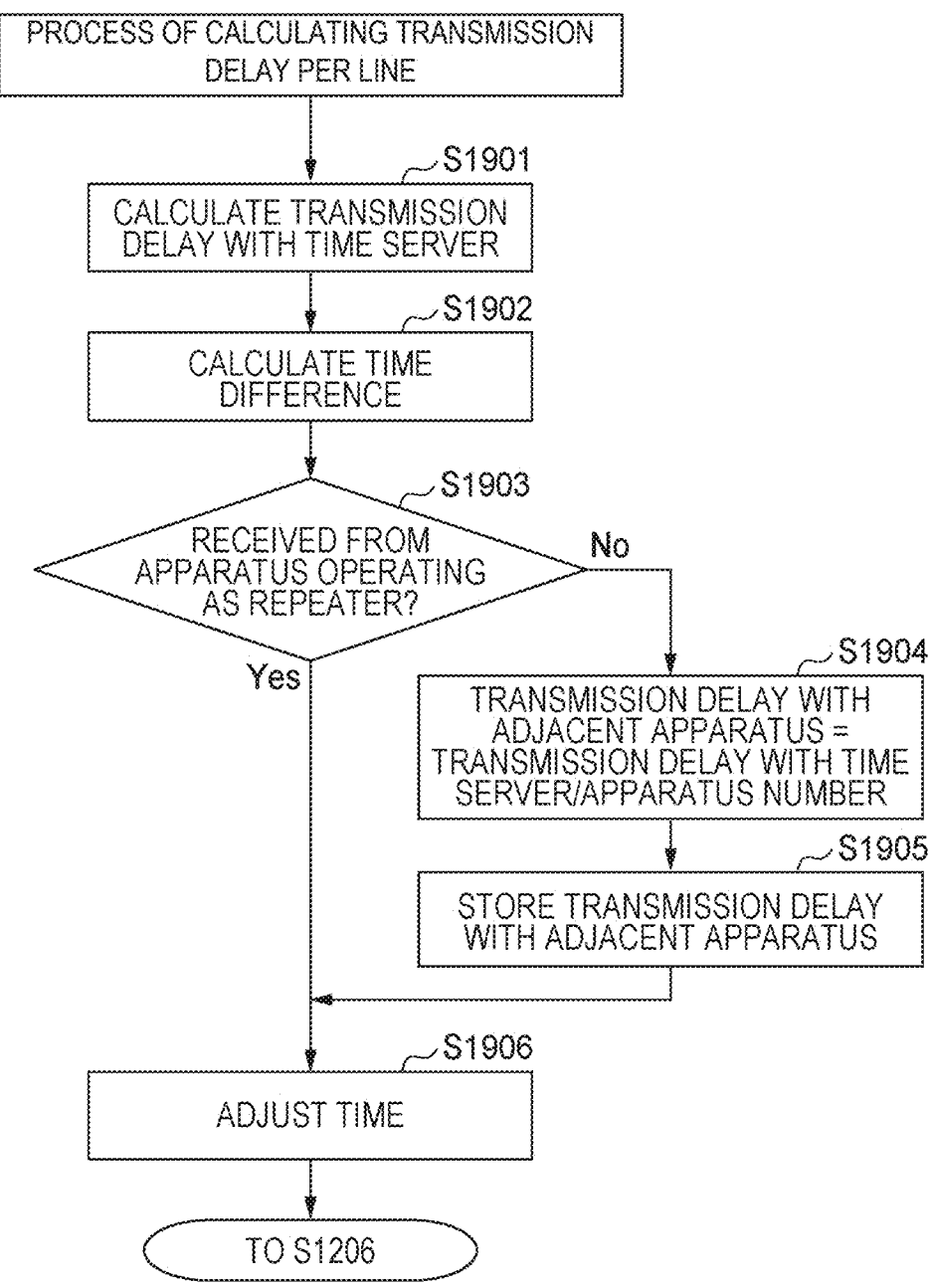
FIG. 19 illustrates a flowchart of a process of calculating a transmission delay per line, performed by each communication apparatus.

FIG. 19 is a flowchart illustrating a process of calculating a transmission delay per line by each communication apparatus 101. The communication apparatus 101 calculates a transmission delay per line while an adjacent apparatus is operating normally. FIG. 19 is performed in the time synchronization processing in S1205 of the Follow_Up packet relaying process illustrated in FIG. 12.

The PTP controller 108 of the communication apparatus 101 calculates the transmission delay between the time server 403 and the communication apparatus 101 (the transmission delay with the time server 403) in accordance with equation (1) described in the first embodiment (S1901). Next, the PTP controller 108 of the communication apparatus 101 calculates the time difference in accordance with equation (2) described in the first embodiment. Next, the operation confirmation controller 106 of the communication apparatus 101 checks whether another communication apparatus 101 connected to the first communication I/F unit 113-1 (adjacent apparatus (first adjacent apparatus)) is operating as a repeater (S1903).

When the adjacent apparatus is not operating as a repeater (No in S1903), the process proceeds to S1904. The PTP controller 108 of the communication apparatus 101 calculates the transmission delay per line by dividing the transmission delay with the time server 403, calculated in S1901, by the number of lines up to the time server 403 (the apparatus number in the example of FIG. 18) (S1904). Then, the PTP controller 108 of the communication apparatus 101 stores that value (the transmission delay per line) (S1905), and the process proceeds to S1906. The transmission delay per line stored in S1905 is used in equations (3) and (4) mentioned above.

When the adjacent apparatus is operating as a repeater (Yes in S1903), the PTP controller 108 of the communication apparatus 101 does not calculate the transmission delay per line, and the process proceeds to S1906. In S1906, the PTP controller 108 adjusts the time of the clock unit 114 in accordance with the above-mentioned time synchronization processing based on PTP. Then, the process proceeds to S1206 in FIG. 12.

As described thus far, the transmission delay per line can be calculated by dividing the transmission delay time from the communication apparatus 101 to the time server 403 by the number of lines through which the packet passes from the communication apparatus 101 to the time server 403. As a result, when an adjacent communication apparatus 101 is operating as a repeater, the more accurate time adjustment can be performed by incorporating the transmission delay per line into the calculation of the residence time in the communication apparatus 101 operating as a repeater.

As described thus far, according to the embodiments described in the present disclosure, when time synchronization information is communicated with the time server and time synchronization is performed in the system where the communication apparatuses are daisy-chain connected, even if there is a communication apparatus in the middle operating as a repeater, the residence time in the communication apparatus can be obtained.

As a result, time synchronization can be performed without deteriorating the accuracy of synchronization in a communication apparatus connected farther away than the communication apparatus operating as a repeater.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102390, filed Jun. 27, 2022, which is hereby incorporated by reference herein in its entirety.

What is claimed is:

1. A communication apparatus connected to a first another communication apparatus, comprising:

at least one processor; and at least one memory in communication with the at least one processor, the at least one memory storing instructions that, when executed by the at least one processor, cause the at least one processor to:

obtain a sending time of a time synchronization packet for performing time synchronization processing in accordance with precision time protocol (PTP), wherein the time synchronization packet is sent from a second communication apparatus connected to the first communication apparatus, and the sending time is a time at which the time synchronization packet is sent in the second communication apparatus;

obtain a reception time of the time synchronization packet in the communication apparatus from the second communication apparatus; and calculate a residence time of the time synchronization packet in the first communication apparatus using the sending time and the reception time in a case where the first communication apparatus is operating as a repeater that sends a packet received from the communication apparatus or the second communication apparatus without applying certain processing to the packet.

2. The communication apparatus according to claim 1, wherein the at least one processor is further configured to determine whether the first communication apparatus functions as the apparatus operating as a repeater.

3. The communication apparatus according to claim 2, wherein:

the communication apparatus, the first communication apparatus, and the second communication apparatus are each assigned a different number, and an inquiry packet is sent for inquiring the number, and, on receipt of the number assigned to the second communication apparatus in response to sending of the inquiry packet, determine that the first communication apparatus functions as the apparatus operating as a repeater.

4. The communication apparatus according to claim 1, wherein:

the time synchronization packet is a Sync packet, and a sending time of the Sync packet is obtained in the second communication apparatus by receiving a time reporting packet including the sending time, sent from the second communication apparatus.

5. The communication apparatus according to claim 4, wherein:

the time reporting packet is a Follow_Up packet, and the communication apparatus is configured to add the residence time calculated to a correction field of the Follow_Up packet, and send the Follow_Up packet to a third communication apparatus connected to the communication apparatus.

6. The communication apparatus according to claim 1, wherein:

the time synchronization packet is a Delay_Req packet, and a sending time of the Delay_Req packet is obtained in the second communication apparatus by receiving a time reporting packet including the sending time, sent from the second communication apparatus.

7. The communication apparatus according to claim 6, wherein the at least one processor is further configured to add the residence time calculated to a correction field of the Delay_Req packet, and send the Delay_Req packet to a third communication apparatus connected to the communication apparatus.

8. The communication apparatus according to claim 1, wherein:

a first transmission delay which is a transmission delay between the communication apparatus and the first communication apparatus is calculated, and the residence time of the time synchronization packet using the sending time, the reception time, and the first transmission delay is calculated.

9. The communication apparatus according to claim 8, wherein:

a second transmission delay which is a transmission delay between a time server configured to distribute time information in accordance with PTP and the communication apparatus is calculated, and calculate a value obtained by dividing the second transmission delay by a number of lines from the communication apparatus to the time server as the first transmission delay.

10. A control method for a communication apparatus connected to a first communication apparatus, the control method comprising:

obtaining a sending time of a time synchronization packet for performing time synchronization processing in accordance with precision time protocol (PTP), wherein the time synchronization packet is sent from a second communication apparatus connected to the first communication apparatus, and the sending time is a time at which the time synchronization packet is sent in the second communication apparatus;

obtaining a reception time of the time synchronization packet in the communication apparatus from the second communication apparatus; and calculating a residence time of the time synchronization packet in the first communication apparatus using the sending time and the reception time in a case where the first communication apparatus is operating as a repeater that sends a packet received from the communication apparatus or the second communication apparatus without applying certain processing to the packet.

11. A non-transitory storage computer-readable storage medium storing a program causing a communication apparatus connected to a first communication apparatus to execute a control method, the control method comprising:

obtaining a sending time of a time synchronization packet for performing time synchronization processing in accordance with precision time protocol (PTP), wherein the time synchronization packet is sent from a second communication apparatus connected to the first communication apparatus, and the sending time is a time at which the time synchronization packet is sent in the second communication apparatus;

obtaining a reception time of the time synchronization packet in the communication apparatus from the second communication apparatus; and calculating a residence time of the time synchronization packet in the first communication apparatus using the sending time and the reception time in a case where the first communication apparatus is operating as a repeater that sends a packet received from the communication apparatus or the second communication apparatus without applying certain processing to the packet.

* * * * *